United States Patent
Lu et al.

(10) Patent No.: US 12,548,166 B2
(45) Date of Patent: Feb. 10, 2026

(54) QUANTITATIVE IMAGING BIOMARKER FOR LUNG CANCER

(71) Applicant: The Trustees of Columbia University in the City of New York, New York, NY (US)

(72) Inventors: Lin Lu, New York, NY (US); Binsheng Zhao, New York, NY (US); Lawrence H. Schwartz, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 339 days.

(21) Appl. No.: 18/176,911

(22) Filed: Mar. 1, 2023

(65) Prior Publication Data

US 2023/0351607 A1    Nov. 2, 2023

Related U.S. Application Data

(63) Continuation of application No. PCT/US2021/048846, filed on Sep. 2, 2021.
(Continued)

(51) Int. Cl.
*G06T 7/136* (2017.01)
*G06T 7/00* (2017.01)
(Continued)

(52) U.S. Cl.
CPC .......... *G06T 7/136* (2017.01); *G06T 7/0012* (2013.01); *G16H 10/60* (2018.01); *G16H 30/20* (2018.01);
(Continued)

(58) Field of Classification Search
CPC .............. G06T 7/136; G06T 7/0012; G06T 2207/10081; G06T 2207/30064;
(Continued)

(56) References Cited

U.S. PATENT DOCUMENTS 10,156,575 B2    12/2018 Lebowitz et al.
10,339,648 B2    7/2019 Stringfield et al.
(Continued)

FOREIGN PATENT DOCUMENTS

WO    2016/191567 A1    12/2016
WO    2017/165801 A1    9/2017

OTHER PUBLICATIONS

International Search Report and Written Opinion of PCT/US2021/048846, mailed on Jan. 31, 2022.
(Continued)

*Primary Examiner* — Jennifer Mehmood
*Assistant Examiner* — Vaisali Rao Koppolu
(74) *Attorney, Agent, or Firm* — LEASON ELLIS LLP

(57) ABSTRACT

In one or more implementations, systems, methods and computer implemented processes are provided that are directed to a method of treating a subject with a lung tumor, the method comprising: obtaining computed tomography (CT) image slices of the subject, wherein the CT image slices comprise images of the lung tumor. In a further implementation, the systems, methods and computer implemented processes are directed to identifying a first CT image slice where the lung tumor has a largest diameter among the CT image slices; and determining intensity-skewness of the lung tumor on the first CT image slice. In a further implementation, the systems, methods and computer implemented processes are directed to treating the subject with surgery, chemotherapy and/or radiotherapy, if the intensity-skewness is no greater than −1.5.

16 Claims, 18 Drawing Sheets

Related U.S. Application Data

(60) Provisional application No. 63/073,477, filed on Sep. 2, 2020.

(51) Int. Cl.
    *G16H 10/60*     (2018.01)
    *G16H 30/20*     (2018.01)

(52) U.S. Cl.
    CPC ............... *G06T 2207/10081* (2013.01); *G06T 2207/30064* (2013.01)

(58) Field of Classification Search
    CPC ............ G06T 2207/30096; G06T 7/11; G06T 2207/20084; G06T 7/62; G16H 10/60; G16H 30/20; G06V 10/25; G06V 10/26; G06V 10/761; G06V 10/7625; G06V 10/764; G06V 10/82; G06V 2201/031; A61B 6/5217; A61B 6/032
    See application file for complete search history.

(56) References Cited

U.S. PATENT DOCUMENTS

| | | | |
|---|---|---|---|
| 10,339,653 | B2 | 7/2019 | Gillies et al. |
| 2008/0317314 | A1* | 12/2008 | Schwartz .............. G06T 7/0012 382/131 |
| 2012/0071334 | A1 | 3/2012 | Colpitts et al. |
| 2015/0356730 | A1* | 12/2015 | Grove ....................... G06T 7/64 382/124 |
| 2017/0358079 | A1* | 12/2017 | Gillies ................... G16H 15/00 |
| 2018/0018757 | A1 | 1/2018 | Suzuki |
| 2018/0068083 | A1 | 3/2018 | Cohen et al. |
| 2019/0019300 | A1* | 1/2019 | Simpson ................... G06T 7/40 |
| 2019/0125279 | A1* | 5/2019 | Peikert ..................... A61B 8/13 |
| 2020/0211180 | A1 | 7/2020 | Gillies et al. |
| 2021/0003555 | A1* | 1/2021 | Ferte ................... A61B 6/5217 |
| 2021/0169349 | A1* | 6/2021 | Madabhushi ........ A61B 5/7275 |

OTHER PUBLICATIONS

Ferlay et al. Estimating the global cancer incidence and mortality in 2018: GLOBOCAN sources and methods, Int. J. Cancer. 2019; 144(8): pp. 1941-1953.

Travis WD. Classification of lung cancer. Semin Roentgenol. 2011; 46(3): pp. 178-186.

Tsao et al. Subtype classification of lung adenocarcinoma predicts benefit from adjuvant chemotherapy in patients undergoing complete resection, J Clin Oncol. 2015; 33(30): pp. 3439-3446.

Aerts et al . . . Decoding tumour phenotype by noninvasive imaging using a quantitative radiomics approach. Nat. Commun. 2014; 5: pp. 4006.

Bi et al. Artificial intelligence in cancer imaging: Clinical challenges and applications. CA Cancer J. Clin. 2019; 69(2): pp. 127-57.

Ikeda et al: "Differential diagnosis of ground-glass opacity nodules: CT number analysis is by three-dimensional computerized quantification": Chest, vol. 132, Issue 3, pp. 984-990, 2007.

Mezheyeuski et al.: "Multispectral imaging for quantitative and compartment-specific immune infiltrates reveals distinct immune profiles that classify lung cancer patients", J Pathol, vol. 44, Issue 4, pp. 421-431, 2018.

Ardila et al: "End-to-end lung cancer screening with three-dimensional deep learning on low-dose chest computed tomography", Nat. Med. Vol. 25, Issue 6, pp. 954-961, 2019.

Zhang et al.: "Accurate classification of non-small cell lung cancer pathology and mapping of EGFR mutation spatial distribution by ambient mass spectrometry imaging." Front Oncol, vol. 9, p. 804, 2019.

Tunali et al.: "Stability and reproducibility of computed tomography radiomic features extracted from peritumoral regions of lung cancer lesions." Med Phys, vol. 46, Issue 11, pp. 5075-5085, 2019.

Aerts: NIH Grant #: 5U01CA190234-05: "Genotype and imaging phenotype biomarkers in lung cancer", Award Notice Date: Dec. 18, 2018.

Clinical Trial #: NCT02095808; Feasibility Study Using Imaging Biomarkers in Lung Cancer, first posted: Mar. 26, 2014.

NIH grant 5U01CA225431-02, "Integrating Radiomics into S0819 and Lung-MAP, Biomarker Driven Clinical Trials for Lung Cancer", Award Notice Date: Jun. 6, 2019.

Lu et al., A quantitative imaging biomarker for predicting disease-free-survival-associated histologic subgroups in lung adenocarcinoma, Eur. Radiol. 2020; 30(7):3614-3623.

Armato et al. The Lung Image Database Consortium (LIDC) and Image Database Resource Initiative (IDRI): a completed reference database of lung nodules on CT scans. Med Phys. 2011; 38(2):915-931.

Breiman L. Bagging predictors. Machine learning. 1996; 24(2): 123-140.

Breiman L. Random forests. Machine learning. 2001; 45(1): 5-32.

Cortes et al., Support-vector networks. Machine learning. 1995; 20(3): 273-297.

Fedorov et al. 3D Slicer as an image computing platform for the Quantitative Imaging Network. Magn Reson Imaging. 2012; 30(9): 1323-1341.

Ko et al. Lung Adenocarcinoma: Correlation of Quantitative CT Findings with Pathologic Findings. Radiology. 2016; 280(3): 931-939.

Liu et al. Predicting the protein SUMO modification sites based on Properties Sequential Forward Selection (PSFS). Biochem Biophys Res Commun. 2007; 358(1): 136-139.

Peng et al. Feature selection based on mutual information: criteria of max-dependency, max-relevance, and min-redundancy. IEEE Trans Pattern Anal Mach Intell. 2005; 27(8): 1226-1238.

Robnik-Šikonja et al., An adaptation of Relief for attribute estimation in regression. Machine Learning: Proceedings of the Fourteenth International Conference (ICML'97); 1997.

Roth et al. Improving Computer-Aided Detection Using Convolutional Neural Networks and Random View Aggregation. IEEE Trans Med Imaging. 2016; 35(5): 1170-1181.

Tachibana et al., Automatic segmentation of pulmonary nodules on CT images by use of NCI lung image database consortium. Proceedings vol. 6144, Medical Imaging 2006: Image Processing; 61440M (2006).

Wang et al. Segmentation of lung nodules in computed tomography images using dynamic programming and multidirection fusion techniques. Acad Radiology. 2009; 16(6): 678-688.

Yang et al. A Response Assessment Platform for Development and Validation of Imaging Biomarkers in Oncology. Tomography. 2016; 2(4): 406-410.

Zhang P. Model selection via multifold cross validation. The Annals of Statistics. 1993, 21(1): 299-313.

Zhao et al. Reproducibility of radiomics for deciphering tumor phenotype with imaging. Sci Rep. 2016; 6: 23428.

\* cited by examiner 5.1

Feature Selection: 'Coarse' stage, screening redundant and non-informative features.

- *Unsupervised clustering to determine redundant feature groups*

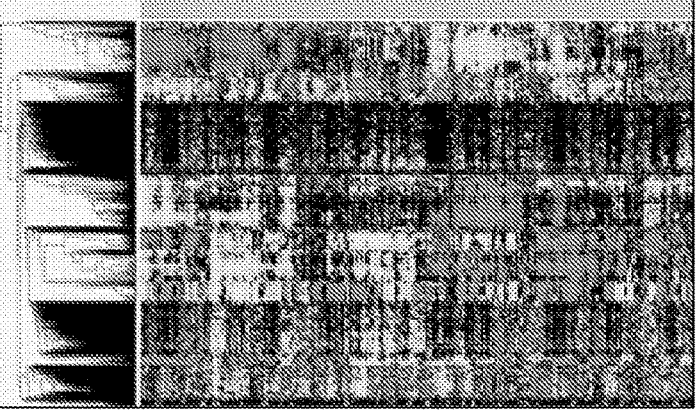

Cut off to define redundant groups    Unsupervised Feature Clustering

Unsupervised Patient Clustering

- *Feature ranking (using different six ranking algorithms) to select the most informative features from redundant feature groups*

| # | Ranking algorithms | # | Ranking algorithms |
|---|---|---|---|
| 1 | T-test score | 4 | Mutual Information |
| 2 | Wilcoxon test score | 5 | minimum Redundancy Maximum Relevance |
| 3 | Uni variance AUC | 6 | ReliefF |

Cont. From FIG.4B

Feature Selection: 'Fine' stage, determining optimal features based on their contributions on building classification models.

- *Forward increment approach to build classification models*
- *Cross-validation to evaluate classification performance for models*
- *Using six different machine-learning classification algorithms*

| # | Classification algorithms | # | Classification algorithms |
|---|---|---|---|
| 1 | K-Nearest Neighbor | 4 | Support Vector Machine |
| 2 | Naive Bayes | 5 | Bagging |
| 3 | LASSO | 6 | Random Forests |

Cont. From FIG.4C

QUANTITATIVE IMAGING BIOMARKER FOR LUNG CANCER

STATEMENT OF GOVERNMENT SUPPORT

This invention was made with government support under CA225431 awarded by the National Institutes of Health. The government has certain rights in the invention.

FIELD OF THE INVENTION

The present invention is directed to an improved approach to evaluating stored and real-time data using machine learning techniques to predict disease-free-survival-associated histologic subgroups in lung adenocarcinoma using at least noninvasive imaging biomarkers.

BACKGROUND OF THE INVENTION

Lung cancer is the most frequently diagnosed cancer and the leading cause of cancer-related deaths worldwide of which adenocarcinoma is the most common histologic subtype. In 2011, the International Association for the Study of Lung Cancer (IASLC), the American Thoracic Society (ATS), and the European Respiratory Society (ERS) proposed a lung cancer histologic subtype classification system. According to the IASLC/ATS/ERS classification system, lung adenocarcinoma is classified as adenocarcinoma in situ (AIS), minimally invasive adenocarcinoma (MIA), invasive adenocarcinoma, which was subdivided into lepidic predominant (LEP), acinar predominant (ACI), papillary predominant (PAP), micropapillary predominant (MIP), solid predominant (SOL) adenocarcinoma, and invasive mucinous (MUC) adenocarcinomas. The IASLC/ATS/ERS classification system has demonstrated significant prognostic and predictive value for patients with resected lung adenocarcinoma. Patients with AIS/MIA/LEP and a complete surgical resection have an excellent prognosis with a 5-year disease-free survival (DFS) higher than 90%. In contrast, patients with ACI/PAP/MIP/SOL/MUC subtypes have a worse prognosis with an average 5-year DFS less than 65%. Successful classification of lung adenocarcinoma patients into subtypes with associated differences in DFS has utility in stratifying patients either prior to surgery or for adjuvant therapy after surgical resection.

The current state of information regarding histologic subtypes of lung adenocarcinoma provides analysis based on analysis of pathology specimens. In current clinical practice, information regarding histologic subtypes of lung adenocarcinoma is based on analysis of pathology specimens. However, for this type of analysis, generally a small portion of the entire tumor is sampled and analyzed. A comprehensive characterization of the entire tumor is generally not performed. Technological advances in medical imaging and image-based noninvasive quantitative imaging biomarker (QIB) hold promise in addressing limitations of sample size (5) principally in the ability to interrogate the entire tumor on imaging. The use of QIB, have showed promise in many thoracic oncologic applications.

The following references, each of which is hereby incorporated by reference as if presented in their respective entireties, describes current approaches to evaluating biomarker data relative to lung cancer diagnosis: Tavis W D. Classification of lung cancer. Semin Roentgenol. 2011; 46(3):178-86; Yang H, Schwartz L H, Zhao B. A Response Assessment Platform for Development and Validation of Imaging Biomarkers in Oncology. Tomography. 2016; 2(4): 406-10; Fedorov A, Beichel R, Kalpathy-Cramer J, Finet J, Fillion-Robin J C, Pujol S, Bauer C, Jennings D, Fennessy F, Sonka M, Buatti J, Aylward S, Miller J V, Pieper S, Kikinis R. 3D Slicer as an image computing platform for the Quantitative Imaging Network. Magn Reson Imaging. 2012; 30(9):1323-41; Roth H R, Lu L, Liu J, Yao J, Seff A, Cherry K, Kim L, Summers R M. Improving Computer-Aided Detection Using Convolutional Neural Networks and Random View Aggregation. IEEE Trans Med Imaging. 2016; 35(5):1170-81; Ko J P, Suh J, Ibidapo O, Escalon J G, Li J, Pass H, Naidich D P, Crawford B, Tsai E B, Koo C W, Mikheev A, Rusinek H. Lung Adenocarcinoma: Correlation of Quantitative CT Findings with Pathologic Findings. Radiology. 2016; 280(3):931-9; Zhao B, Tan Y, Tsai W Y, Qi J, Xie C, Lu L, Schwartz L H. Reproducibility of radiomics for deciphering tumor phenotype with imaging. Sci Rep. 2016; 6:23428; Peng H, Long F, Ding C. Feature selection based on mutual information: criteria of max-dependency, max-relevance, and min-redundancy. IEEE Trans Pattern Anal Mach Intell. 2005; 27(8):1226-38; Robnik-Sikonja M, Kononenko I, editors. An adaptation of Relief for attribute estimation in regression. Machine Learning: Proceedings of the Fourteenth International Conference (ICML'97); 1997; Liu B, Li S, Wang Y, Lu L, Li Y, Cai Y. Predicting the protein SUMO modification sites based on Properties Sequential Forward Selection (PSFS). Biochem Biophys Res Commun. 2007; 358(1):136-9; Cortes C, Vapnik V. Support-vector networks. Machine learning. 1995; 20(3):273-97; Breiman L. Bagging predictors. Machine learning. 1996; 24(2):123-40; Breiman L. Random forests. Machine learning. 2001; 45(1):5-32; Zhang P. Model selection via multifold cross validation. The Annals of Statistics. 1993: 299-313; Armato S G, 3rd, McLennan G, Bidaut L, McNitt-Gray M F, Meyer C R, Reeves A P, Zhao B, Aberle D R, Henschke C I, Hoffman E A, Kazerooni E A, MacMahon H, Van Beeke E J, Yankelevitz D, Biancardi A M, Bland P H, Brown M S, Engelmann R M, Laderach G E, Max D, Pais R C, Qing D P, Roberts R Y, Smith A R, Starkey A, Batrah P, Caligiuri P, Farooqi A, Gladish G W, Jude C M, Munden R F, Petkovska I, Quint L E, Schwartz L H, Sundaram B, Dodd L E, Fenimore C, Gur D, Petrick N, Freymann J, Kirby J, Hughes B, Casteele A V, Gupte S, Sallamm M, Heath M D, Kuhn M H, Dharaiya E, Burns R, Fryd D S, Salganicoff M, Anand V, Shreter U, Vastagh S, Croft B Y. The Lung Image Database Consortium (LIDC) and Image Database Resource Initiative (IDRI): a completed reference database of lung nodules on CT scans. Med Phys. 2011; 38(2):915-31; Tachibana R, Kido S, editors. Automatic segmentation of pulmonary nodules on CT images by use of NCI lung image database consortium. Medical Imaging 2006: Image Processing; 2006: International Society for Optics and Photonics; and Wang Q, Song E, Jin R, Han P, Wang X, Zhou Y, Zeng J. Segmentation of lung nodules in computed tomography images using dynamic programming and multidirection fusion techniques. Acad Radiology. 2009; 16(6):678-88.

However, these references and descriptions of various approaches are generally directed to sampling a small portion of the entire tumor for analysis. A comprehensive characterization of the entire tumor is generally not performed. Furthermore, these approaches do not describe or detail algorithms than can be deployed to provide novel tools for detecting lung adenocarcinoma using at least noninvasive imaging biomarkers. Thus, what is needed are technological advances in medical imaging and image-based noninvasive quantitative imaging biomarker (QIB) that aid in addressing limitations of sample size principally in the ability to interrogate the entire tumor on imaging. Furthermore, what is needed in the art is an approach that allows for noninvasive QIBs to provide complementary information to histopathology and ultimately improve the classification of histologic subgroups of lung adenocarcinoma patients.

SUMMARY OF THE INVENTION

In one or more implementations provided herein, noninvasive quantitative imaging biomarkers are used to provide complementary information to histopathology and improve the classification of histologic subgroups of lung adenocarcinoma patients. In one or more implementations, a system, process or computer implemented method is provided that uses QIB data in lung patient classification, or thoracic oncologic applications.

In one or more implementations, systems, methods and computer implemented processes are provided that are directed to a method of treating a subject with a lung tumor, the method comprising: obtaining computed tomography (CT) image slices of the subject, wherein the CT image slices comprise images of the lung tumor. In a further implementation, the systems, methods and computer implemented processes are directed to identifying a first CT image slice where the lung tumor has a largest diameter among the CT image slices; and determining intensity-skewness of the lung tumor on the first CT image slice. In a further implementation, the systems, methods and computer implemented processes are directed to treating the subject with surgery, chemotherapy and/or radiotherapy, if the intensity-skewness is no greater than −1.5.

In one or more further implementations, based on the evaluation of the patient, the proposed treatment can be selected from at least surgery, chemotherapy and/or radiotherapy. In one or more implementations, based on the output of the evaluation of the CT scans, the analytic platform 105 proposes that the treatment be chemotherapy, wherein the chemotherapy includes a platinum-based antineoplastic drug. In a further implementation, the platinum-based antineoplastic drug is cisplatin and/or or carboplatin.

In a further implementation, the systems, methods and computer implemented processes are directed to an intensity-skewness according to the following:

$$\text{Intensity\_Skewness} = \frac{\frac{1}{N}\sum_{i=1}^{N}(X(i)-\bar{X})^3}{\left(\sqrt{\frac{1}{N}\sum_{i=1}^{N}(X(i)-\bar{X})^2}\right)^3}$$

wherein the tumor segmentation has N pixels: 1, . . . ith, . . . N, X(i) being an intensity of the ith pixel within the tumor segmentation, $\bar{X}$ being a mean intensity of all pixels within the tumor segmentation.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIGS. 4A-4E. Provides a flow diagram of particular steps of the training of particular predictive models of lung cancer patient evaluation system.

DETAILED DESCRIPTION OF ONE OR MORE EMBODIMENTS

Figure 1:
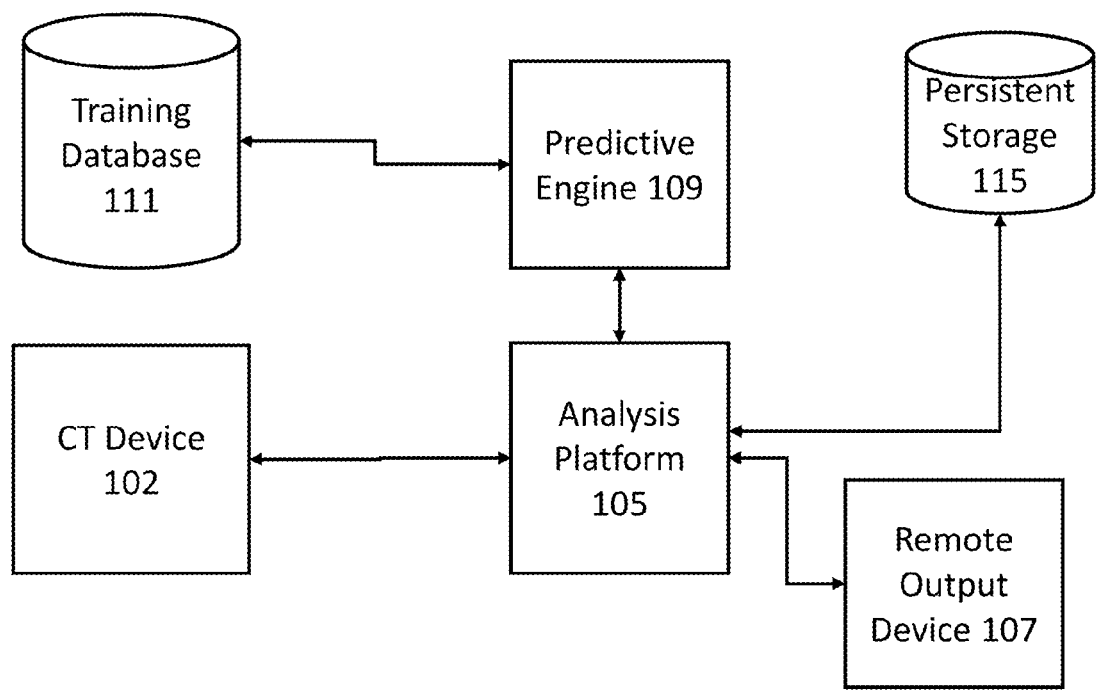
FIG. 1. Provides a block diagram of the components of the lung cancer patient evaluation system provided herein.

By way of overview, the systems, processes and apparatus described herein are directed to robust and generalizable CT-based quantitative imaging biomarker (QIB) identification and applications thereof. In a particular implementation, the identified QIBs are used to predict histologic subgroups that have association with disease-free survival (DFS) in patients with resected lung adenocarcinoma. In one or more implementations, QIBs are identified by one or more machine learning or predictive models that have been trained on a training set of data to identify those QIBs having a high correlation to DFS in patients with resected lung adenocarcinoma.

For example, a comprehensive machine-learning and deep-learning based analytical system is described that configures a processor or processing system to identify reproducible QIBs and help to understand QIBs' significance. In one particular implementation, a specific QIB, Intensity-Skewness, which is a measure quantifying tumor density distribution, has been identified as an optimal biomarker for predicting histologic subgroups. Intensity-Skewness, as provided in more detail herein, has achieved high AUCs (95% CI) of 0.849(0.813,0.881), 0.820(0.781,0.856) and 0.863(0.827,0.895) on training, internal validation and external validation cohorts, respectively. A criterion of Intensity-Skewness<−1.5, which can be correlated to high tumor density, showed high specificity of 96% (sensitivity 46%) and 99% (sensitivity 53%) on predicting the mid/poor DFS group in the training and external validation cohorts, respectively.

By way of further overview, the approaches described herein relate to the use of one or more QIBs derived from acquired CT data using one or more machine learning modules trained to be able to predict lung adenocarcinoma histologic subgroups. Using such predictive information, one or more personalized treatment decision-making systems are configured to implement a personalized care plan for lung cancer patients.

As described in more detail herein, to identify optimal QIBs, an automated analytical pipeline was implemented.

The analytical pipeline includes a deep-learning based tumor segmentation module, well-validated and reproducible imaging features modules and an optimal constructed machine learning model that work in conjunction to configure one or more processors to evaluate CT scan or image data and identify QIBs having relevance to lung adenocarcinoma histologic subgroups.

The inventors have found that this non-routine, non-conventional approach of evaluating CT datasets using a deep learning analytical pipeline provides for improved efficiency and accuracy relative to other approaches in the field of prediction of lung adenocarcinoma histologic subgroups. For example, the described approaches are more computationally efficient, and demonstrate high accuracy when compared to prior approaches. As provided in more detail herein, the systems, methods and processes described herein can be incorporated into one or more software applications, either cloud based or locally configured that can be used for the prediction of the lung adenocarcinoma histologic subgroup in which a given patient may be classified. Based on this classification, the patient can be enrolled in a custom or personalized treatment plan earlier that possible with prior approaches.

Turning now to FIG. 1, a system diagram is provided detailing components integrated into the QIB identification and detection system. While the foregoing examples provided specific components integrated into the QBI identification and detection system, it will be appreciated that other components could be integrated to add additional or alternative functionality to those described herein.

In one or more implementations, the described analysis platform includes one or more CT image sources 102. For example, one or more CT image sources 102 can be a computed tomography imaging device. For example, the CT image device 102 is a standard, commercially available or custom CT imaging device configured to evaluate and generate computed tomography image scans of a patient. In such a configuration, scan data obtained by the CT imaging device (operating as the CT image source 102) is directly provided to one or more processing devices in accordance to the system diagram provided.

However, in one or more alternative arrangements, the CT image source 102 is a database or data store of prior obtained CT images for a given patient or user. In such a configuration, the CT image source device 102 includes the necessary hardware and software to permit the access and retrieval of stored or archived CT scan data relating to a patient or group of patients.

In one or more implementations, the CT image source device 102 is configured to, either directly from an imaging device or an image storage location, transmit CT image data to a remote server or processor. In one particular implementation, the data recorded or obtained by the CT image source device 102 is transmitted to a remote monitoring station or remote server. In one or more implementations, the data obtained by the CT image source device 102 is transmitted in real-time to a processor or server (such as but not limited to analysis platform 105) for analysis. In a particular implementation, the data recorded or obtained by the CT image source device 102 is transmitted by wireless communication protocols, such as WiFi, Cellular and satellite communication networks to the analysis platform 105.

In one or more implementations, the analysis platform 105 includes one or more processors or computer elements. For example, a processor when used generally throughout, and not exclusively when referring to the analysis platform, can be a computer or discrete computing element such as microprocessor. In one or more particular implementations, the processor is incorporated into one a desktop or workstation class computer that executes a commercially available operating system, e.g., MICROSOFT WINDOWS, APPLE OSX, UNIX or Linux based operating system implementations. In another implementation, the processors or computers of the analysis platform 105 are located or configured as a cloud or remote computing cluster made of multiple discrete computing elements, such as servers. Such a cloud computing cluster is available on an as needed basis and can provide a pre-determined level of computing power and resources. In accordance with alternative embodiments, the processors or computer of the analysis platform 105 can be a portable computing device such as a smartphone, wearable or tablet class device. For example, analysis platform 105 is an APPLE IPAD/IPHONE mobile device, ANDROID mobile device or other commercially available mobile electronic device configured to carry out the processes described herein. In other embodiments, the analysis platform 105 comprises custom or non-standard hardware configurations. For instance, the analysis platform 105 may comprise one or more micro-computer(s) operating alone or in concert within a collection of such devices, network adaptors and interfaces(s) operating in a distributed, but cooperative, manner, or array of other micro-computing elements, computer-on-chip(s), prototyping devices, "hobby" computing elements, home entertainment consoles and/or other hardware.

The analysis platform 105 can be equipped or be in communication with a persistent memory (not shown) that is operative to store the operating system or the relevant computer or processor in addition to one or more additional software modules, such as those described herein that relate to implementing visual tests and providing for virtual assistant functionality in accordance with embodiments described herein. In one or more implementations, the persistent memory includes read only memory (ROM) and/or a random-access memory (e.g., a RAM). Such computer memories may also comprise secondary computer memory, such as magnetic or optical disk drives or flash memory, that provide long term storage of data in a manner similar to the persistent storage. In accordance with one or more embodiments, the memory comprises one or more volatile and non-volatile memories, such as Programmable Read Only-Memory ("PROM"), Erasable Programmable Read-Only Memory ("EPROM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or similar hardware modules. In one or more embodiments, the memory of the analysis platform 105 provides for storage of application program and data files when needed by a processor or computer. One or more read-only memories provide program code that the processor or computer of the analysis platform 105 reads and implements at startup or initialization, which may instruct a processor associated therewith to execute specific program code from the persistent storage device to load into RAM at startup.

In one embodiment provided herein, the modules stored in memory utilized by the analysis platform 105 comprise software program code and data that are executed or otherwise used by one or more processors integral or associated with the analysis platform 105 thereby causing the analysis platform 105 to perform various actions dictated by the software code of the various modules. For instance, the analysis platform 105 is configured with one or more processors that are configured to execute code. Here, the code includes a set of instructions for evaluating data received from the telemetry device 102.

Building on the prior example, the analysis platform 105 at startup retrieves initial instructions from ROM as to initialization of one or more processors. Upon initialization, program code that the processor retrieves and executes from ROM instructs the processor to retrieve and begin execution of data analysis application program code. The processor begins execution of the data analysis application program code, loading appropriate program code to run into RAM and presents a user interface to the user that provides access to one or more functions that the program code offers. According to one embodiment, the data analysis application program code presents a main menu after initialization that allows for the creation or modification of the information or protocols that are relevant to a user. While reference is made to code executing in the processor, it should be understood that the code can be executed or interpreted or comprise scripts that are used by the processor to implement pre-scribed routines.

In accordance with certain embodiments, the analysis platform 105 is also in communication with a persistent data store 115 that is located remote from the remote persistent data store 115 such that the analysis platform 105 is able to access the remote persistent data store 115 over a computer network, e.g., the Internet, via a network interface, which implements communication frameworks and protocols that are well known to those of skill in the art.

In one configuration, the database 115 is connected to the analysis platform 105 via a server or network interface and provides additional storage or access to user data, community data, or general-purpose files or information. The physical structure of the database 115 may be embodied as solid-state memory (e.g., ROM), hard disk drive systems, RAID, disk arrays, storage area networks ("SAN"), network attached storage ("NAS") and/or any other suitable system for storing computer data. In addition, the database 115 may comprise caches, including database caches and/or web caches. Programmatically, the database 115 may comprise flat-file data store, a relational database, an object-oriented database, a hybrid relational-object database, a key-value data store such as HADOOP or MONGODB, in addition to other systems for the structure and retrieval of data that are well known to those of skill in the art.

In addition to a persistent storage device 115, the analysis platform 105 may connect to one or more remote computing devices 107. Such computing devices are configured to exchange data with the analysis platform 105.

Continuing with FIG. 1, the analysis platform 105 is configured to provide information and exchange data with a predictive engine 109. In one or more implementations, the predicative engine 109 is configured as a collection of sub-modules executed by the processors of the analysis platform 105. However, in alternative implementations, the predictive engine 109 is configured as a separate computing element, or collection of computing elements (such as a cloud system, server, computing cluster or other remote hardware configuration) that is communication with the analysis platform 105.

In one or more implementations, the predictive engine 109 is configured to implement a machine learning algorithm to train a predictive model to predict histologic subgroups that have association with DFS in patients with resected lung adenocarcinoma. In one or more implementations, the predictive engine 109 is configured to implement a predictive algorithm to evaluate data obtained from the CT image source devices 102 and identify a biomarker or image feature that corresponds or correlates to a pre-determined classification of patients with lung cancer. For example, the predictive engine 109 is configured to implement one or more classification algorithms such as logistic regression, support vector machine, naive Bayes classifier, and decision trees. In a particular implementation, the predictive engine 109 is configured to implement a classification algorithm to generate a model that can classify user into one or more clinical categories based on at least the value of an intensity-skewness measurement of the CT image data.

In the particular implementation described herein, the predictive engine utilizes a classification algorithm that evaluates the CT image data to obtain an intensity skewness data value for Intensity-Skewness <−1.5. The inventors have found that this non-routine, non-conventional approach allows for high specificity to predict the mid/poor DFS group. For example, test and validation of the classification engine provided a specificity of 96% (sensitivity 53%) and 99% (sensitivity 46%). Thus, in one or more implementations, utilization of an intensity-skewness focused approach by the predictive engine 109 allows for the computing system to conserve more resources, as computational bandwidth does not need to be expended to evaluate a complex set of image features. Thus, the evaluation and/or classification of an individual patient can be conducted on computing platform that has sufficient resources to identify intensity-skewness but would be incapable of implementing a more complex image or feature analysis.

Figure 2:
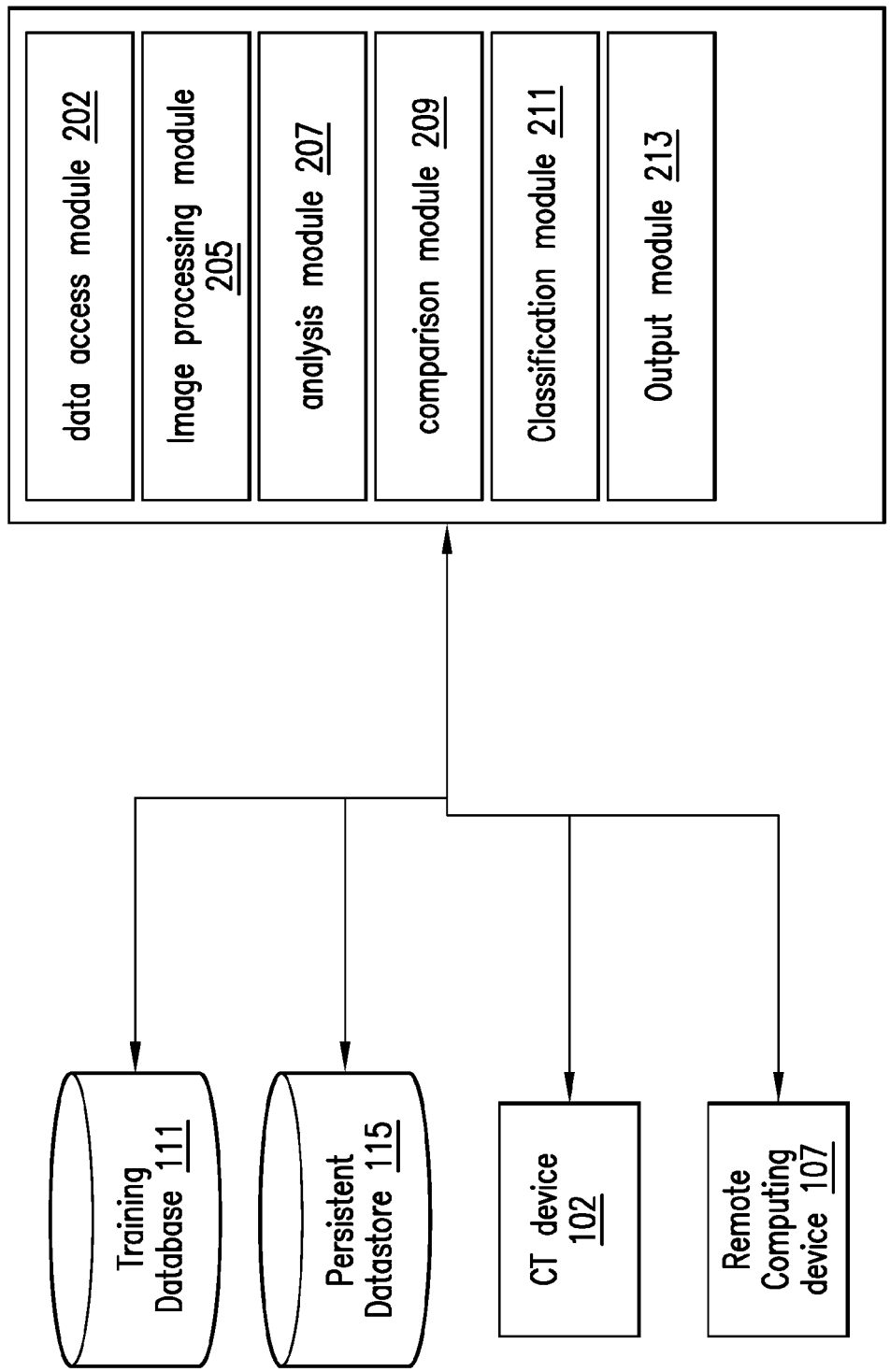
FIG. 2. Provides module diagram the process of training and evaluating data according to the lung cancer patient evaluation system provided herein.
Figure 3:
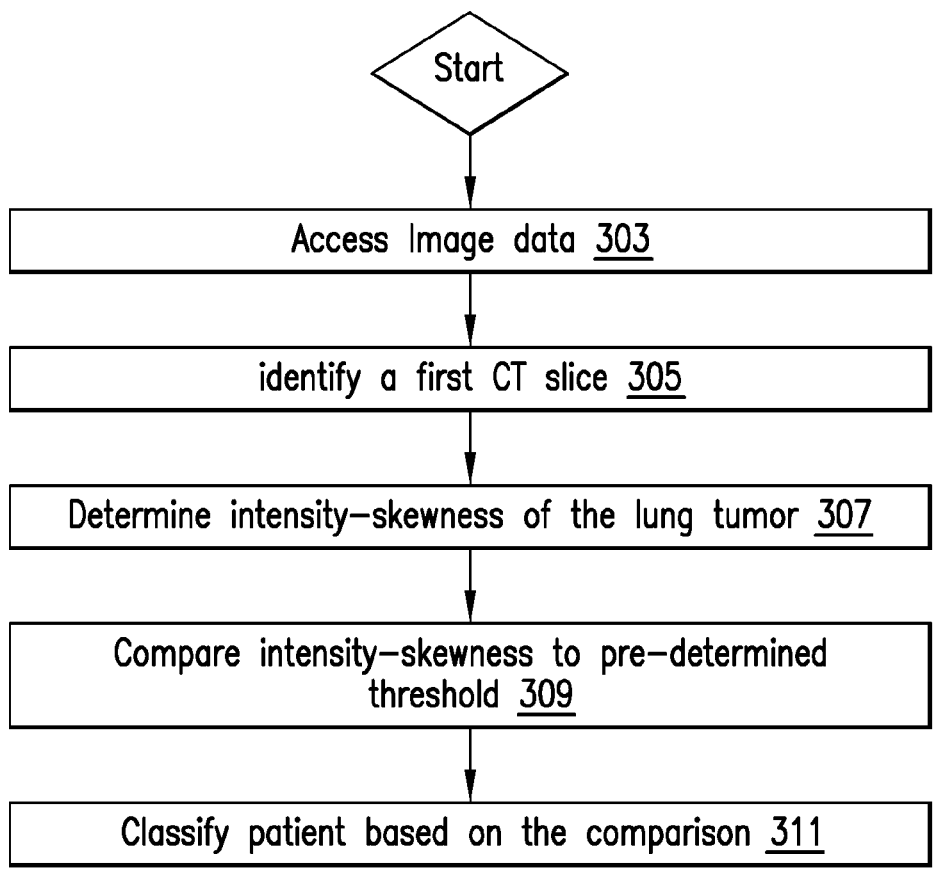
FIG. 3. Provides a module diagram of particular components of the lung cancer patient evaluation system herein.
Figure 4A:
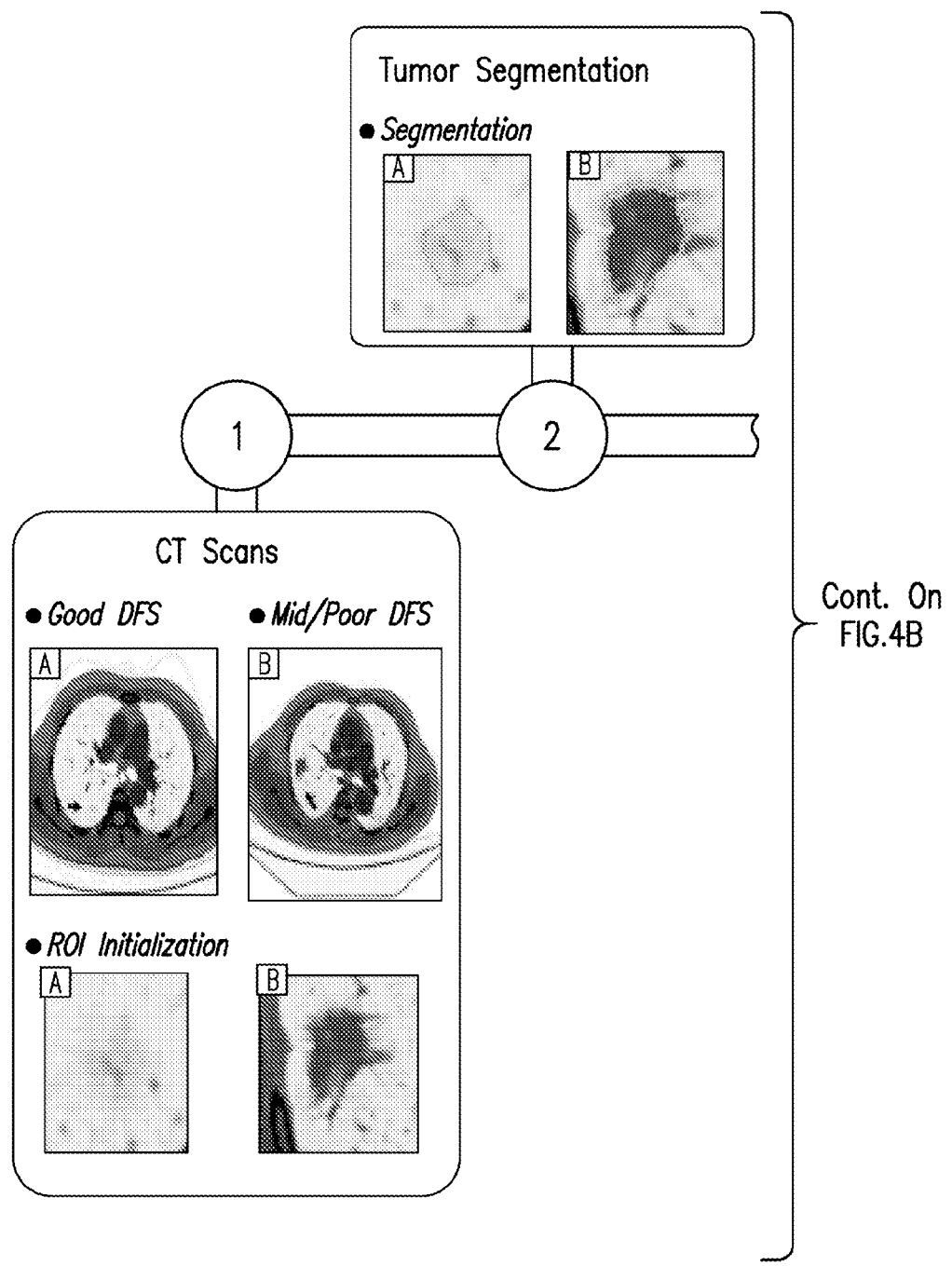
Figure 4B:
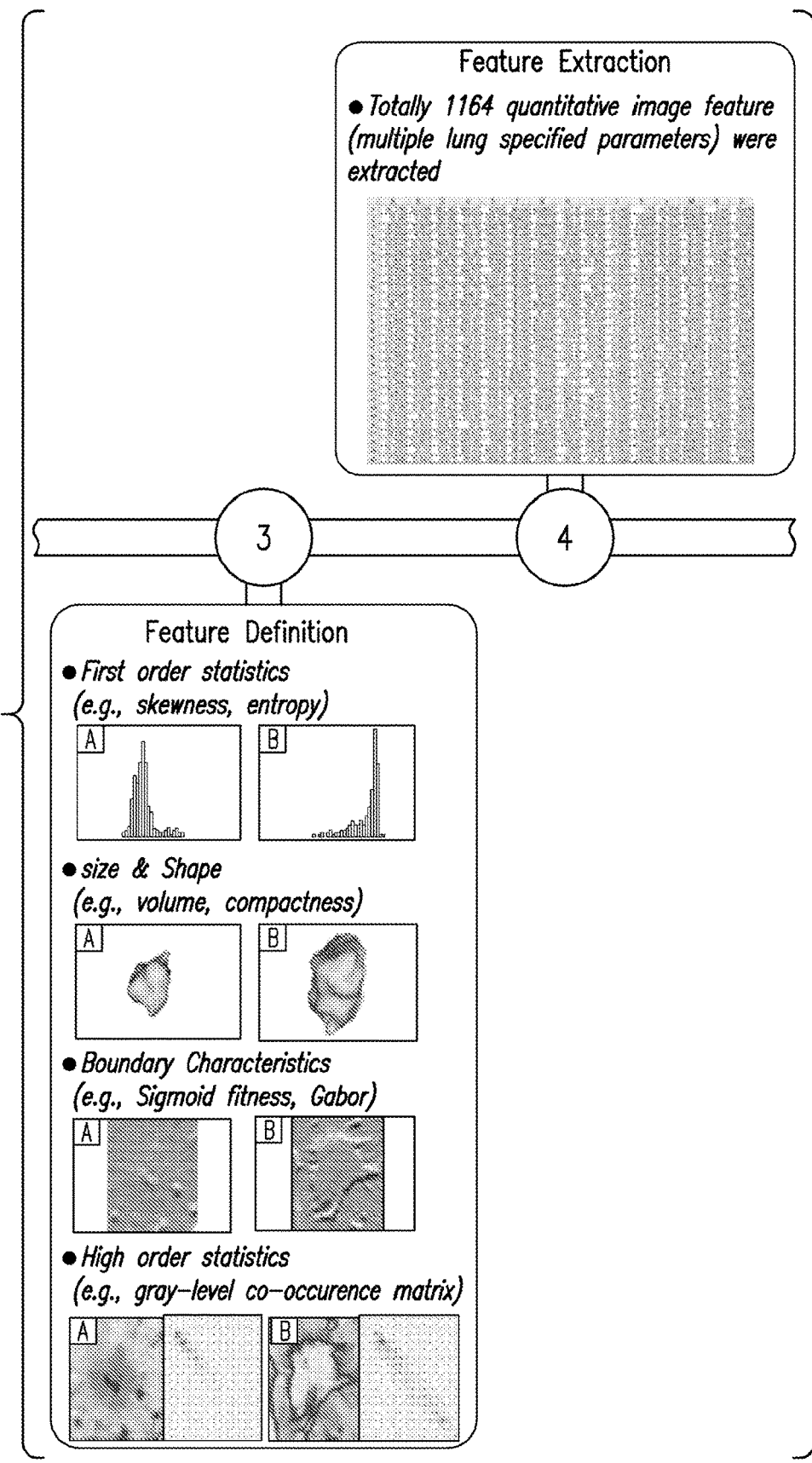
Figure 4E:
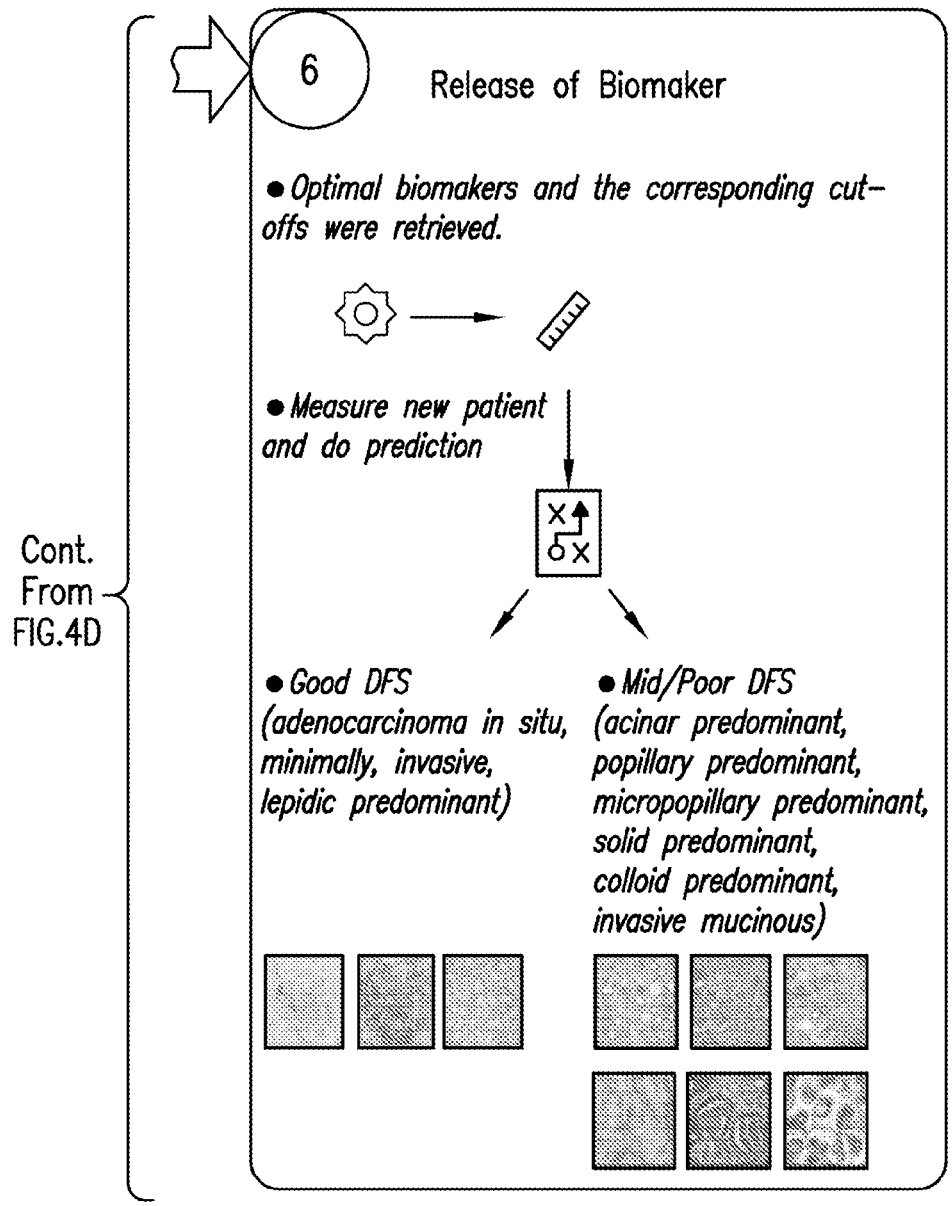

As shown with respect to FIGS. 2 and 3, the process of evaluating a patient CT image and classifying the patient according to disease-free survival (DFS) categories includes evaluating a CT image of the given patient.

For instance, as shown in step 303 of FIG. 3, a CT image of a particular patient is accessed for processing. In one or more implementations, the image is accessed from a persistent storage device 115. In an alternative configuration, the CT image is sent in real time from a CT imaging device 102. For instance, the images produced during a CT imaging session of a patient are directly sent to the analysis platform 105 for processing. In one or more implementations, the CT access step 303 is implemented by one or more access modules 202 that configure a computer or processor of the analysis platform 105. The access module 202 configures the computer or processor to establish a communication linkage with the persistent storage device 115, CT Device 102 or other source of CT image data for a particular individual and initiate a transfer of data relating thereto. In one or more particular implementations, the CT images are comprised of image slices of a patient. In a further implementation, the CT images are comprised of image slices of a lung tumor residing within the lungs of a patient.

In another configuration, the access module 202 is configured to access one or more CT images from a collection of existing patients. Here, the existing collection of CT images are stored in a training database 111. Here, the training database include a collection of screened, categorized or manually annotated CT images. Likewise, such screened image have associated data labels. For example, one or more CT images stored in the training database have been labeled as having good or poor DFS.

The collection of CT images and data can be passed to the prediction engine 109 to serve as training data for training a predictive model.

As shown in step 305 of FIG. 3, one or more processors of the analytic platform 105 is configured to process or evaluate the CT images obtained from the CT image device or image source 102. As shown in step 305 the processor is configured by one or more image processing modules 205 to process the CT images. For example, the image processing modules 205 configure a processor or computer of the analytic system to obtaining one or more slices (images) and identifying the largest diameter for the imaged tumor. For example, the image processing module 205 is configured to conduct image analysis or image recognition on the CT images and extract the region of the image that corresponds to a depiction of the lung tumor. In a further implementation, the image processing module 205 is configured to identify which image among a collection of CT images that depicts the largest diameter of a tumor. For example, the analytic system 105 is configured by the image processing modules 205 to identify a tumor region within the CT image slices. From there, the extracted pixel length of each of the extracted regions are compared to one another so as to identify the CT image depicting the largest diameter of the tumor.

Turning now to step 307, the analytic platform 105 is further configured by an analysis module 207 configured to evaluate the image identified as having the largest diameter of tumor. For example, a processor or computer of the analytic platform, upon identifying the CT image having the largest tumor diameter, is configured to process the entire CT image containing the largest tumor diameter. In one or more implementations, an intensity-skewness sub-module of the analysis module 207 configures the analytic platform 105 to calculate the intensity-skewness of the identified CT image.

As used herein, skewness is a first-order histogram index to describe distorted normal distribution of data; skewed either to the left (positive skewness value) or to the right (negative skewness value). Intensity-skewness describes the distortion of tumor pixel-density distribution, skewed either to the dark area (low radiation attenuation) or to the bright area (high radiation attenuation). When a tumor is solid, its distribution of radiation attenuation is skewed to the right with a negative skewness value; in contrary, when a tumor is less solid (e.g., glass-ground opacity and subsolid nodule), its distribution of radiation attenuation is skewed to the right with a positive skewness value.

In one or more implementations, the analysis module 207 is configured to assign a numeric value to the tumor based on the skewness value. For example, the analysis module 207 is configured to assign an Intensity-Skewness <−1.5, for those tumors exhibiting high tumor density. As detailed herein, Intensity-Skewness that are <−1.5 has been shown to achieve high specificity to predict the mid/poor DFS group. For example, the inventors have conducted training and external validation on data cohorts, where the use of intensity-skewness cutoff of >-1.5 specificity of 96% (sensitivity 53%) and 99% (sensitivity 46%), for predicting DFS group classification.

As shown in step 309, once the intensity-skewness value for a given CT image slice for a given patient has been obtained, the intensity-skewness value is then compared to a threshold value. For example, the determined intensity-skewness value for a given CT image is compared against a cut-off threshold of −1.5. In one or more implementations, a comparison module 209 is used to compare the calculated intensity-skewness value for a CT image to the pre-determined threshold value.

In one or more further implementations, the cut-off threshold value is accessed from the predictive engine. For example, the analytic system is configured to obtain from a trained model that is configured to output a cut-off threshold value that is predictive of mid/poor DFS classification. The mean±std of Intensity-Skewness in the three data cohorts for good DFS group were −0.05±0.77, −0.71±1.32, 0.35±0.72 respectively, and for mid/poor DFS group were −1.66±1.37, −2.47±1.34, −1.41±1.57 respectively, suggesting that the lower the Intensity-Skewness was, the poorer the DFS would be. Furthermore, a stratification analysis has shown that the classification performance of Intensity-Skewness was not affected by patient age, gender, TNM stage, the manufacturer of CT and the slice thickness of the CT reconstruction.

As shown in step 311, where the Intensity-Skewness for a given patient's CT image is <−1.5, the patient is classified as having mid/por DFS. For example, in one or more implementations, the analytic system is configured to access one or more remote computers or systems containing patient records or information. Here a patient classification module 211 configures the processor or computer of the analytic system to update a remote or local record associated with the patient whose CT scan was evaluated. For instance, the patient classification module adjusts a data field or entry corresponding to the DFS group that the patient is assigned. Where the intensity-skewness value for the patient indicates that that patient should be classified within a particular DFS group, the patient classification module 211 configures the processor or computer of the analytic platform 105 to classify the patient.

Here, the processor can be configured by an output module 213 to transmit data value, file, code, data stream, or other information formats between the remote computer 107 and the analysis platform 105 to cause the data corresponding to the patient classification to be updated.

Once the patient is classified according to the DFS group, the patient can be administered specific or customized medication for the particular DFS group that the patient has been classified into. For example, based on the evaluation of the patient, the proposed treatment can be selected from at least surgery, chemotherapy and/or radiotherapy. In one or more implementations, based on the output of the evaluation of the CT scans, the analytic platform 105 proposes that the treatment be chemotherapy, wherein the chemotherapy includes a platinum-based antineoplastic drug. In a further implementation, the platinum-based antineoplastic drug is cisplatin and/or or carboplatin.

In yet a further implementation, the chemotherapy includes one or more of gemcitabine, paclitaxel, docetaxel, pemetrexed, etoposide, vinorelbine, topotecan, irinotecan, or combinations thereof.

In one or more arrangements where the analytic platform proposes surgical treatment options, the analytic platform is configured to propose a wedge resection. Wedge resection is less-invasive but at the risk of lymph node metastasis. Our aim is to provide additional quantitative information for decision making on whether patient should undergo wedge resection or not. That is, if patients are predicted to have lymph node metastasis of high probability, they are recommended not to undergo wedge resection. Thus, where the DFS classification is poor, then the analytic platform 105 is configured to not suggest wedge resection. Conversely, where the analytic platform 105 determines the DFS for a patient is good, then wedge resection is suggested. In one or more further implementations, the analytic platform 105 is configured to provide treatment guidance in accordance with NCCN Guidelines for Non-Small cell lung cancer, such as guideline version 5.2020, herein incorporated by reference as if presented in its entirety.

For example, the provided disclosure is directed to a system for evaluating medical records of a collection of patients, the system comprising a patient database, such as database 115, that includes a plurality of patient records. In this configuration, the processor or analytic platform is configured to batch process patient data. For example, a local or networked image database for a health care institution can be batch processed according to the approach described herein. For example, where a institution includes plurality of records corresponding to patients diagnosed with lung cancer and each record includes one or more CT image scans for each patient, the analytic platform 105 can evaluate such images and classify patient as having good or poor DFS.

In such a configuration, a processor is configured to execute code to access from each record of an institution, all CT images of a lung tumor and identify from all the CT images for a given patient, the CT image depicting the largest lung tumor diameter. Using this information, as described more generally herein, the processor is configured to automatically, without human intervention, determine the intensity-skewness of the lung tumor on the CT image slice identified as having the largest diameter.

Using this information, the processor is further configured to classify the subject to one of a plurality of a plurality of disease-free-survival (DFS)-associated histologic subgroup based on a comparison of the intensity-skewness to a threshold value. Once the classification has been made, each record in the patient database is updated to reflect the classification of the patient.

In a further implementation, once the patients have been classified an appropriate treatment option can be proposed. For example, the inventors have shown that the QBI of intensity-skewness is correlated to the DFS classification. One or more processors of the analytic platform 105 are configured to determine the distance between the intensity-skewness value for a given patient and the threshold values (for example −1.5). Based the level of distance, one of a plurality of treatment options can be proposed based on the level of distance. For example, where there is less than 1, 3, 5, or 10% difference between the intensity-skewness value and the threshold value, the analytic system proposes a more aggressive treatment option. Here, the closer the intensity-skewness value is to the threshold value, the more aggressive the proposed treatment option proposed by the analytic platform 105. For example, the analytic platform 105 is configured to update each record with a proposed treatment option based on the difference between the intensity-skewness of the patient and the threshold value.

In a further implementation the identified biomarker is combined with one or more other biomarker values, such as histological subtype group to provide an improved classification of DSF. In this arrangement, the analytic platform 105 is configured to evaluate provide both the subtype group and the intensity-skewness values to a model or machine learning algorithm that generates a classification of the patient's DFS value. For instance, one or more neural network training algorithms are used to evaluate prelabeled data sets for patients that have been assigned a DFS value. This training data can be used to train a model that is configured to output a DSF value for an unlabeled patient when provided with the patient's CT scan and histologic subtype.

In one or more implementations, and shown with particular reference to FIGS. 4A-4E and 6A-6B, the methods, systems and computer implemented products described herein are directed to training a machine learning model to identify one or more biometric features from a CT image and establish a threshold value for the biometric feature that correlates to a DFS category for lung cancer patients. In the foregoing example, the inventors have evaluated CT images from a training dataset and have, through the use of the predictive engine 109, one or more biomarkers that can be correlated with DFS categories. For example, and in no way limiting, the predictive engine 109 is configured to review 1313 CT scans of patients with resected lung adenocarcinomas from two geographically distant institutions. Three study cohorts, the training, internal validation and external validation cohorts, were created, within which lung adenocarcinomas were divided into two disease-free-survival (DFS) associated histologic subgroups, the mid/poor and good DFS groups. A comprehensive machine-learning and deep-learning based analytical system was adopted to identify reproducible QIBs and help to understand QIBs' significance.

In the foregoing and provided examples, CT data was obtained for a number of patients meeting the following criteria from two institutions, institution A and B: patients underwent complete surgical resection;
    patients did not have previous history of primary lung cancer;
    patients have complete pathological reports based on the 2011 IASLC/ATS/ERS lung cancer classification system;
    patients have chest CT scanning within four weeks prior to surgery;
    patients have solitary lung lesion; and
    patients did not undergo pre-treatment (e.g., chemotherapy and radiotherapy) before surgery.

In one or more particular implementations, the biomarker identification process includes at least the steps of 1) region of interest (ROI) initialization, 2) tumor segmentation, 3) feature definition, 4) feature extraction, 5) feature selection and 6) biomarker analysis. By way of further example, the fifth 'feature selection' module was based on a coarse-to-fine feature selection strategy, which subdivided into a 'coarse' and a 'fine' stages. Details of each module are provided herein.

Figure 12A:
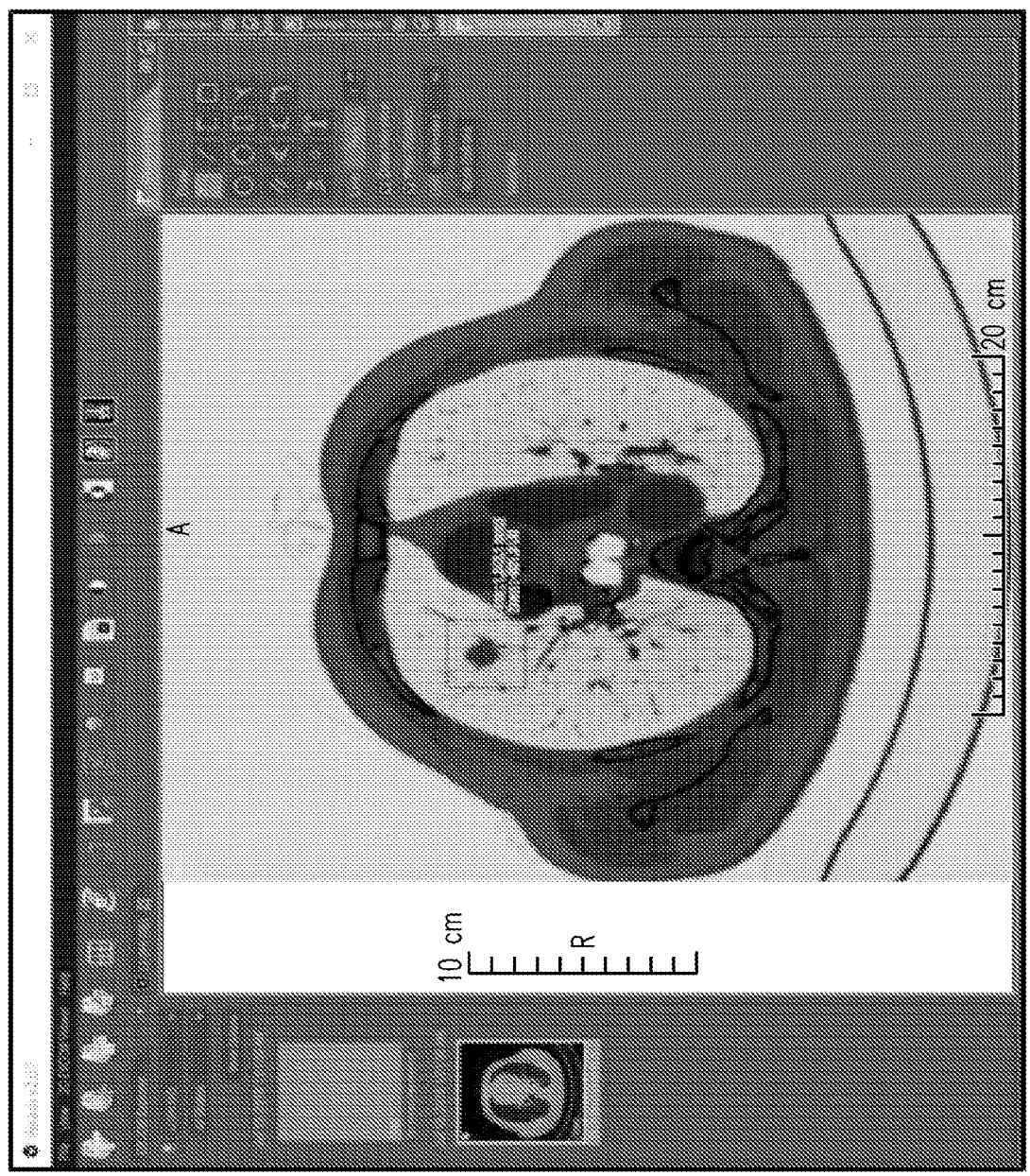
FIGS. 12A-12B. Provides a user interface detailing aspects of the lung cancer patient evaluation system.
Figure 12B:
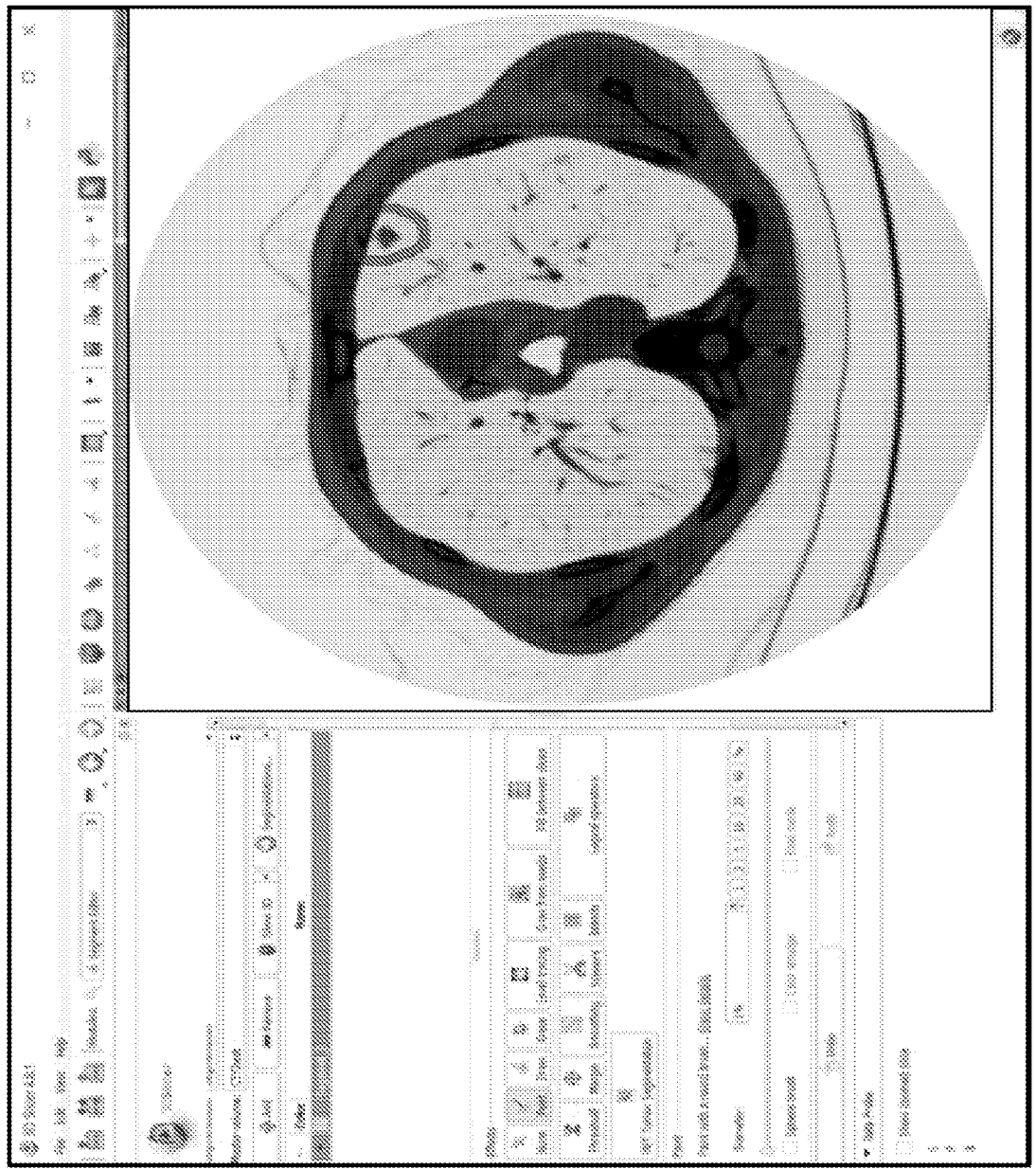

As shown with reference to FIGS. 12A-12B, all slices within a CT scan can be reviewed. For instance, a radiologist can manually review and draw an initial ROI on one CT slice where tumor had the largest diameter.

At institution A, ROI was drawn by two senior radiologists using a customized lung-specific image visualization platform, the Weasis (2), and at institution B, ROI initialization was drawn by one junior radiologist using a publicly available image visualization platform, the 3D Slicer (3). The drawing of initial ROI was performed on CT images acquired at venous phase and under a lung-specific CT window (width, 1500 HU; level, −500 HU). Examples of initial ROIs on Weasis and 3D-Slicer image visualization platforms were provided in FIGS. 12A-12B [[S3]]. The only requirement for ROI is roughly enclosing the tumor. ROI can be circle, box, or any other shape, just depending on the editing tool provided by the image visualization platform. As shown in FIGS. 12A-12B, on the Weasis platform, radiologist can easily place a rectangle on tumor using the 'Measurement' module, while on the 3D-Slicer platform, radiologist can easily draw a circle using the 'Segment Editor' module.

The 3D tumor segmentation was implemented on Matlab (version 2018b; Mathworks). All parameter settings for training the 3D tumor segmentor were as follows,
    Volumetric data were interpolated to 0.5×0.5×0.5 mm$^3$;
    Image input sizes to SegNet was 224×224;

Creat SegNet via the Matlab command "segnetLayers (imageSize,numClasses=2,'vgg16')";
Augmentation=10, by cropping ten 2D images from random views around the tumor center;
CNN Solver='sgdm';
CNN learning rate=0.001;
CNN Momentum=0.9;
CNN MiniBatchSize=8;
CNN MaxEpochs=10;
The number of random views=100 (according to the literature (4)).

Other training parameters that were not mentioned were all set as default by Matlab. For example, the architecture of 2D SegNet segmentor can be seen in FIGS. 6A-6B which details those additional training parameters.

Continuing with the example provided, in order to evaluate suitable biomarkers for use in the analytic platform 105, 1164 quantitative imaging features were defined. Among them, four features were defined by radiologist, including 'Mass', 'Mass disappear ratio' (5), 'Volume' and 'Volume disappear ratio' (5), and other 1160 feature were defined by engineer. The 1160 engineer-defined features were derived from 15 feature classes by applying different implementation parameters. For example, features could be calculated in the forms of 2D and 3D. 2D features were calculated on the image slice where tumor had the maximal diameter. 3D features were calculated on the entire 3D volumetric data. When calculating 2D features, 8 connected pixels were considered as the neighboring pixels. When calculating 3D features, 26 connected voxels were considered as the neighboring voxels. The distance d between two neighboring pixels can be d=1, 2, 3, 4, 5 etc. On the aspect of pixel-pair direction, 4 pixel-pair direction were applied for 2D features, while 13 pixel-pair direction were applied for 3D features. Thus, one feature in a feature class might be expanded by 2×5×(4+13)=170 folds via applying 2D and 3D computation under different distances between neighboring pixels on different direction. The 15 feature classes were presented as follows:

Feature class #1. Size-related (Uni, Bi, Vol);
Feature class #2. First Order Statistics (Intensity_Mean, Intensity_SD, Intensity_Skewness, Intensity_Kurtorsis);
Feature Class #3. Shape (Compact-Factor, Eccentricity, Round-Factor, Solidity);
Feature Class #4. Surface Shape (Shape_SI1, Shape_SI2, Shape_SI3, Shape_SI4, Shape_SI5, Shape_SI6, Shape_SI7, Shape_SI8, Shape_SI9);
Feature Class #5. Sigmoid Functions (Sigmoid-Amplitude, Sigmoid-Slope, Sigmoid-Offset);
Feature Class #6. Wavelets features (DWT-H, DWT-V, DWT-D, DWT-LH, DWT-LV, DWT-LD);
Feature Class #7. Edge Frequency features (EdgeFreq_Mean, EdgeFreq_Coarseness, EdgeFreq_Contrast);
Feature Class #8. Fractal Dimension (Fractal_Mean, Fractal_SD);
Feature Class #9. Gray-Tone Difference Matrix (GTDM) (Coarseness, Contrast, Busyness, Complexity, Strength);
Feature Class #10. Gabor Energy (Gabor_0, Gabor_45, Gabor_90, Gabor_135);
Feature Class #11. Laws' Energy (Law_1, Law_2, Law_3, Law_4, Law_5, Law_6, Law_7, Law_8, Law_9, Law_10, Law_11, Law_12, Law_13, Law_14);
Feature Class #12. Laplacian of Gaussian (LoG) (LoG_Mean_Gray_Intensity, LoG_Uniformity, LoG_Entropy);
Feature Class #13. Run-Length features (Run_SPE, Run_LPE, Run_GLU, Run_PLU, Run_PP);
Feature Class #14. Spatial Correlation (Spatial_corrlation); and
Feature Class #15. Gray-Level Co-occurrence Matrix (GLCM) (ASM, Contrast, Correlation, Sum of squares, Homogeneity, Inverse Difference Moment, Sum average, Sum entropy, Entropy, Different Variance, Different Entropy, IMC1, IMC2, MCC, Maximal Probability, Cluster Tendency);

S5.2 Feature Extraction

In one or more implementations, the predictive engine 109 or one or more modules thereof is configured to implement feature extraction. In alternative configurations, the feature extraction can be implemented on commercial hardware and/or software, such as on Matlab (version 2018b; Mathworks). In the provided example, feature extraction is performed on Matlab. It will be appreciated that before feature extraction, all image volumetric data were interpolated to isotropic resolution of 0.5×0.5×0.5 $mm^3$ by tri-linear interpolation.

As shown in FIGS. 4A-4E and 6A-6B, a 'coarse' to 'fine' two-stage feature selection system was developed to select optimal features out of the totally 1164 candidate features. The feature selection system integrated several machine-learning techniques, including unsupervised clustering, feature ranking, feature searching and classification model building.

In one or more implementations, the predictive engine 109 is configured to evaluate the CT scan images obtained from a training or validation database one or more software module configured to implement the two-stage feature selection. Within the two-stage system, the first stage performed coarse selection to screen large number of redundant and non-informative features. The coarse selection consisted of two procedures, unsupervised hierarchical clustering and feature ranking. The unsupervised hierarchical clustering was performed in three steps. Firstly, calculate correlation (Spearman's rank correlation coefficient) between features; secondly, organize all features into a hierarchical clustering tree according to their mutual correlations; finally, by setting a correlation threshold, all features were separated into a series of redundant feature groups (For instance, when setting correlation threshold as 10.51, it means all candidate features were clustered into a series of redundant feature groups, within which mutual correlation of all features exceeded 10.51). Within each redundant feature group, only the most informative features were kept, and others were excluded. In our study, six feature ranking algorithms were applied to rank the correlated features. The six feature ranking algorithms were t-test score, Wilcoxon-test score, uni-variance AUC, mutual information, mRMR, and RelieF.

At the second stage, fine feature selection was performed based on the candidate feature list provided by coarse selection. Fine feature selection consisted of Incremental Forward Search (IFS) approach and six machine-learning based classification algorithms. IFS initiated on an empty feature set and then iteratively include features if and only if the addition of the feature could increase the performance of classification models. Six machine-learning based classification algorithms were used to build classification models based on candidate features. Here the algorithms that can be implemented include K-Nearest Neighbor, Naïve Bayes, Least absolute shrinkage and selection operator (LASSO), Support vector machine (SVM), Bagging and Random Forests. The evaluation of classification model was in terms of area under the receiver operating characteristic curve (AUC), which was estimated by ten-fold cross-validation.

Since six feature ranking algorithms were used to rank candidate features and six machine-learning based classification algorithms to build classification models, there were totally 6×6=36 candidate classification models after the two stage feature selections. Among the 36 candidate models, the model that achieved the highest AUC were selected as the optimal model. Features selected to build the optimal model were identified as optimal features. Within the optimal features, features that contributed the most to the model were defined as the imaging biomarkers.

The following Table (table S1) provides an overview of the CT signs evaluated by the predictive engine 109.

TABLE S1

| CT Signs | Levels | Definition |
| --- | --- | --- |
| Density | Solid/Partial/GGO | Density of the target lesion. |
| BubbleLike-Lucency | Yes/No | The presence of air in the tumor at the time of diagnosis prior to biopsy or treatment. |
| Air-Bronchogram | Yes/No | Tube-like or branched air structure within the tumor. |
| Pleural-Retraction | Yes/No | Retraction of the pleura toward the tumor. |
| Vascular-Convergence | Yes/No | Convergence of vessels to the tumor, only applied to the peripheral tumors. |
| Vascular-Involvement | Yes/No | Vessels narrowed, occluded, or encased by the tumor, only applied to the contrast-enhanced images |
| Peripheral-Emphysema | Yes/No | Peripheral emphysema caused by the tumor. |
| Peripheral-Fibrosis | Yes/No | Peripheral fibrosis caused by the tumor. |
| Border-Definition | Well-defined/ill-defined | Well- or ill-defined border |
| Spiculation | Yes/No | Lines radiating from the margins of the tumor. |
| Lobulation | Yes/No | A lobulated border was defined as a portion of a lesion's surface that showed a wavy or scalloped configuration. |

Table S2 details the standard-of-care contrast-enhanced CT used to obtain CT scans of the dataset used to develop the biomarker analysis at least four weeks prior to the surgery. The CT scanning characteristics for the three data cohorts were provided as follows.

TABLE S2

CT Scanning Characteristics.

| | | Training cohort | Internal validation cohort | p° | External validation cohort | p° |
| --- | --- | --- | --- | --- | --- | --- |
| Manufacturer (Model names, Convolution kernels) | SIEMENS (SOMATOM Flash/Force, B20f/B30f/B31f/Br44d) | 89 (19%) | 4 (1%) | <0.0001* | 268 (64%) | <0.0001* |
| | GE MEDICAL SYSTEMS (Identification CT750 HD, STANDARD) | 132 (29%) | 129 (30%) | | 76 (18%) | |
| | Philips (Brilliance 16/iCT 256, B/C) | 122 (26%) | 163 (38%) | | 37 (9%) | |
| | TOSHIBA (Aquilion/Aquilion One, F03/F04) | 120 (26%) | 132 (31%) | | 41 (10%) | |
| Slice Interval (mm) | 0.625 | 0 (0%) | 0 (0%) | <0.0001* | 6 (1%) | <0.0001* |
| | 0.7 | 31 (7%) | 0 (0%) | | 0 (0%) | |
| | 0.75 | 0 (0%) | 0 (0%) | | 191 (45%) | |
| | 0.8 | 24 (5%) | 2 (0%) | | 6 (1%) | |
| | 1 | 226 (49%) | 297 (69%) | | | |
| | 1.25 | 132 (29%) | 129 (30%) | | 72 (4%) | |
| | 2 | 50 (11%) | 0 (0%) | | 40 (10%) | |
| Slice Thickness (mm) | 0.625 | 0 (0%) | 0 (0%) | <0.0001* | 6 (1%) | <0.0001* |
| | 1 | 187 (40%) | 116 (27%) | | 289 (68%) | |
| | 1.25 | 132 (29%) | 129 (30%) | | 71 (17%) | |
| | 1.5 | 0 (0%) | 0 (0%) | | 15 (4%) | |
| | 2 | 144 (31%) | 183 (43%) | | 41 (10%) | |
| KVP | 80 | 4 (1%) | 0 (0%) | <0.0001* | 0 (0%) | <0.0001* |
| | 90 | 26 (6%) | 0 (0%) | | 0 (0%) | |
| | 100 | 51 (11%) | 0 (0%) | | 58 (14%) | |
| | 120 | 380 (82%) | 409 (96%) | | 364 (86%) | |
| | 140 | 2 (0%) | 19 (5%) | | 0 (0%) | |
| mAs | Mean ± std | 155.6 ± 60.0 | 182.1 ± 72.2 | <0.0001* | 202.35 ± 74.06 | <0.0001* |
| Pixle Spacing | Mean ± std | 0.747 ± 0.072 | 0.736 ± 0.067 | 0.0213 | 0.749 ± 0.062 | 0.034 |

It will be appreciated that different segmentation methods have different outcomes on the developed predictive models used by the predictive engine 109. As described in more detail herein, the public available Lung Image Database Consortium and Image Database Resource Initiative (LIDC-IDRI) dataset is used for comparison among different lung tumor segmentation methods. The comparison results were presented in Table S3. There were two points needed to be noted. First, all the segmentation methods listed in Table S4 were auto-segmentation that only a user initialization (e.g., a ROI, VOI or seed point) was required and without further user interaction. Second, the comparisons were relative, as methods' training and testing sets were different. For our study, we only reported the result on those lung nodules larger than 1 cm, because all the lung lesions in our training cohort were larger than 1 cm.

TABLE S3

Performance of different lung tumor auto-segmentation methods on the LIDC-IDRI dataset.

| Method | Year | Training* | Testing | IoU |
|---|---|---|---|---|
| Tachibana and Kido (15) | 2006 | N/A | 23 | 50.7 ± 21.9% |
| Wang et al. (16) | 2009 | 23 | 64 | 58% |
| Messay et al. (17) | 2010 | N/A | 68 | 63 ± 16% |
| Kubota et al. (18) | 2011 | N/A | 23 | 69 ± 18% |
|  |  |  | 82 | 59 ± 19% |
| Tan et al. (19) | 2013 | N/A | 23 | 65% |
| Lassen et al. (20) | 2015 | N/A | 19 | 52 ± 7% |
|  |  |  | 40 | 50 ± 14% |
| Messay et al. (21) | 2015 | 300 | 66 | 71.70 ± 19.89% |
|  |  |  | 77 | 69.23 ± 13.82% |
| Wang et al. (22) | 2017 | 350 | 493 | 71.16 ± 12.22% |
| Our proposed method | 2019 | N/A | 374 | 70.04 ± 11.68% |

*N/A indicates that the method did not use LIDC-IDRI data as training data.

As shown, six feature ranking and six machine-learning algorithms were employed to build model, resulting in totally thirty-six candidate models. The evaluation results of the thirty-six candidate models in terms of AUC were presented in Table S4.

TABLE S4

Performances of candidate models in terms of AUC.

| Ranking | Classification | | | | | |
|---|---|---|---|---|---|---|
|  | KNN | NaiveBayes | LASSO | SVM | RF | Bag |
| TTest Score | 0.828 | 0.827 | 0.841 | 0.827 | 0.827 | 0.840 |
| Wilcoxon Score | 0.837 | 0.827 | 0.830 | 0.830 | 0.822 | 0.832 |
| Uni-Varaiance AUC | 0.837 | 0.827 | 0.849 | 0.830 | 0.822 | 0.832 |
| Mutual Information | 0.792 | 0.659 | 0.758 | 0.713 | 0.809 | 0.811 |
| mRMR | 0.826 | 0.819 | 0.850 | 0.801 | 0.816 | 0.830 |
| ReliefF | 0.823 | 0.799 | 0.829 | 0.806 | 0.809 | 0.819 |

Figure 5:
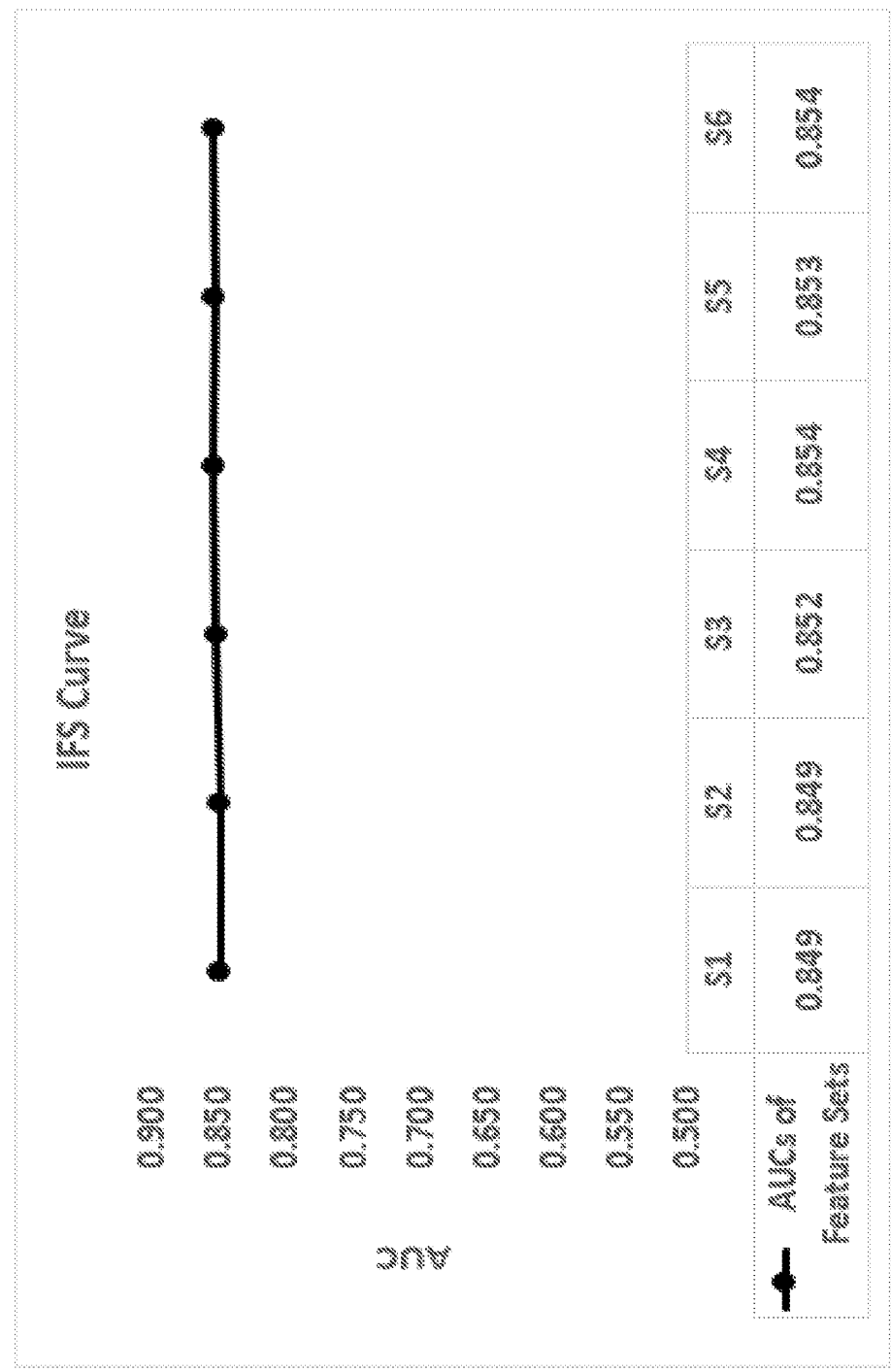
FIG. 5. Provides a chart detailing aspects of the lung cancer patient evaluation system.
Figure 6A:
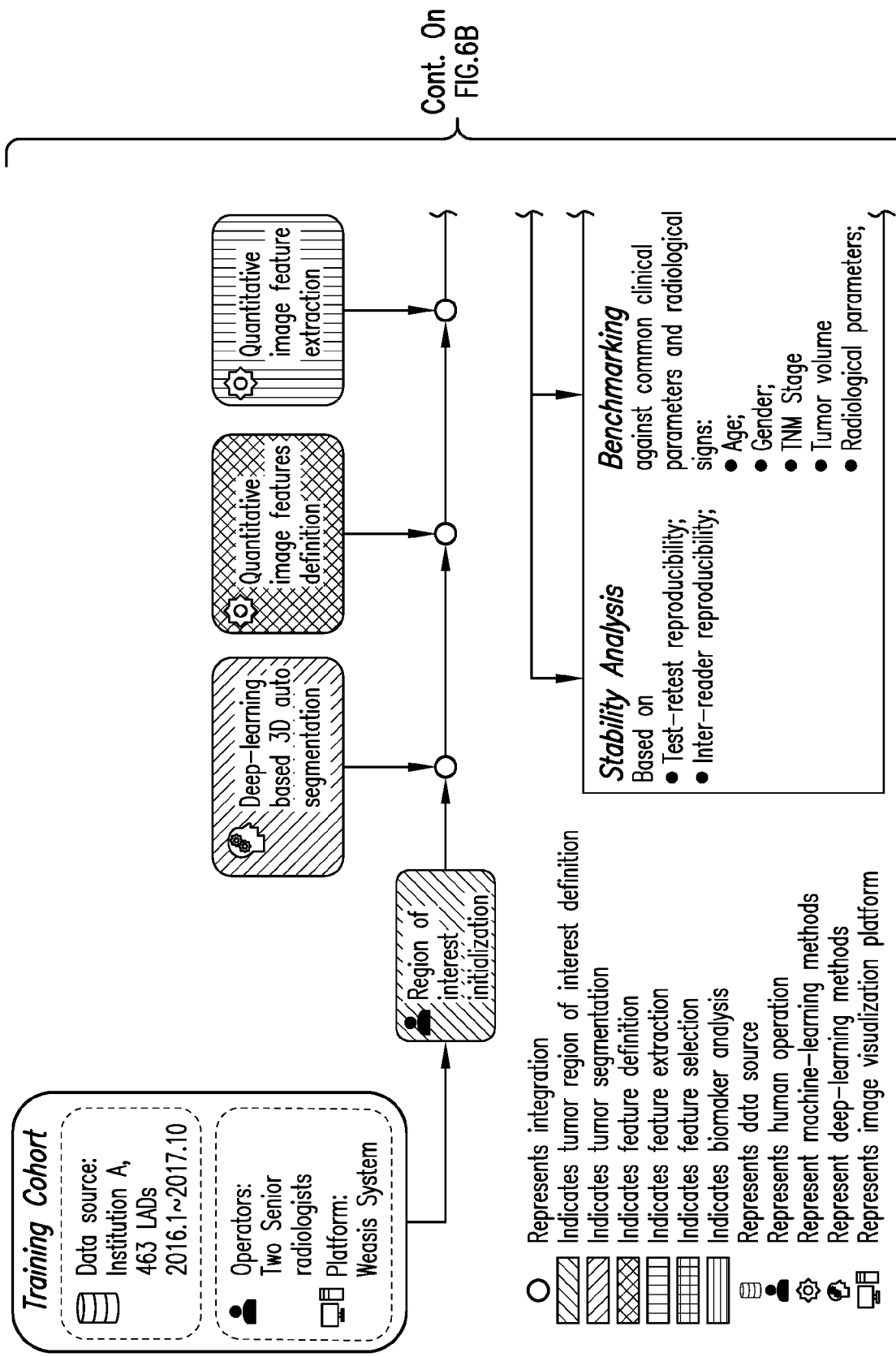
FIGS. 6A-6B. Provides a flow diagram detailing aspects of the lung cancer patient evaluation system.
Figure 6B:
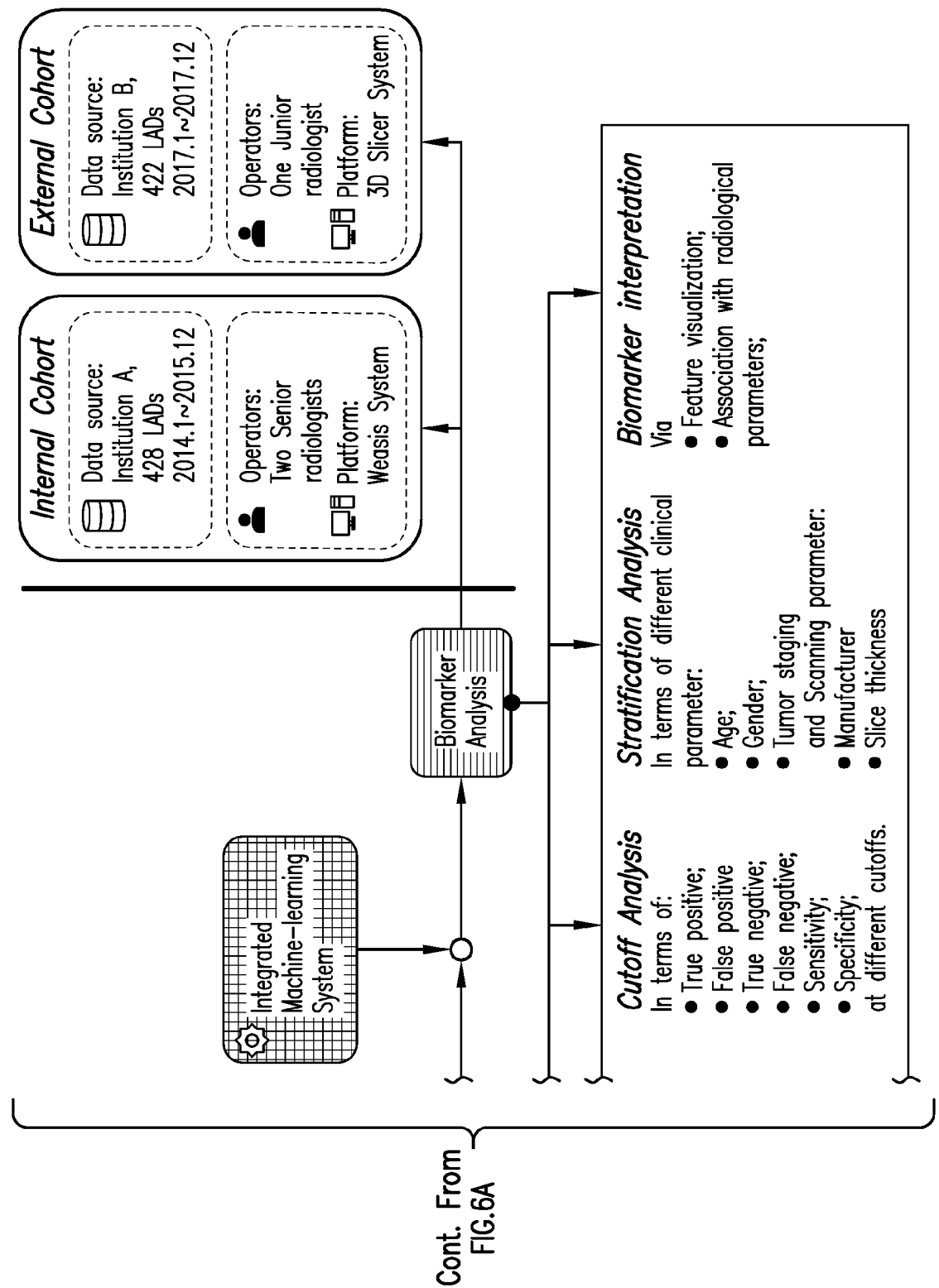
Figure 7:
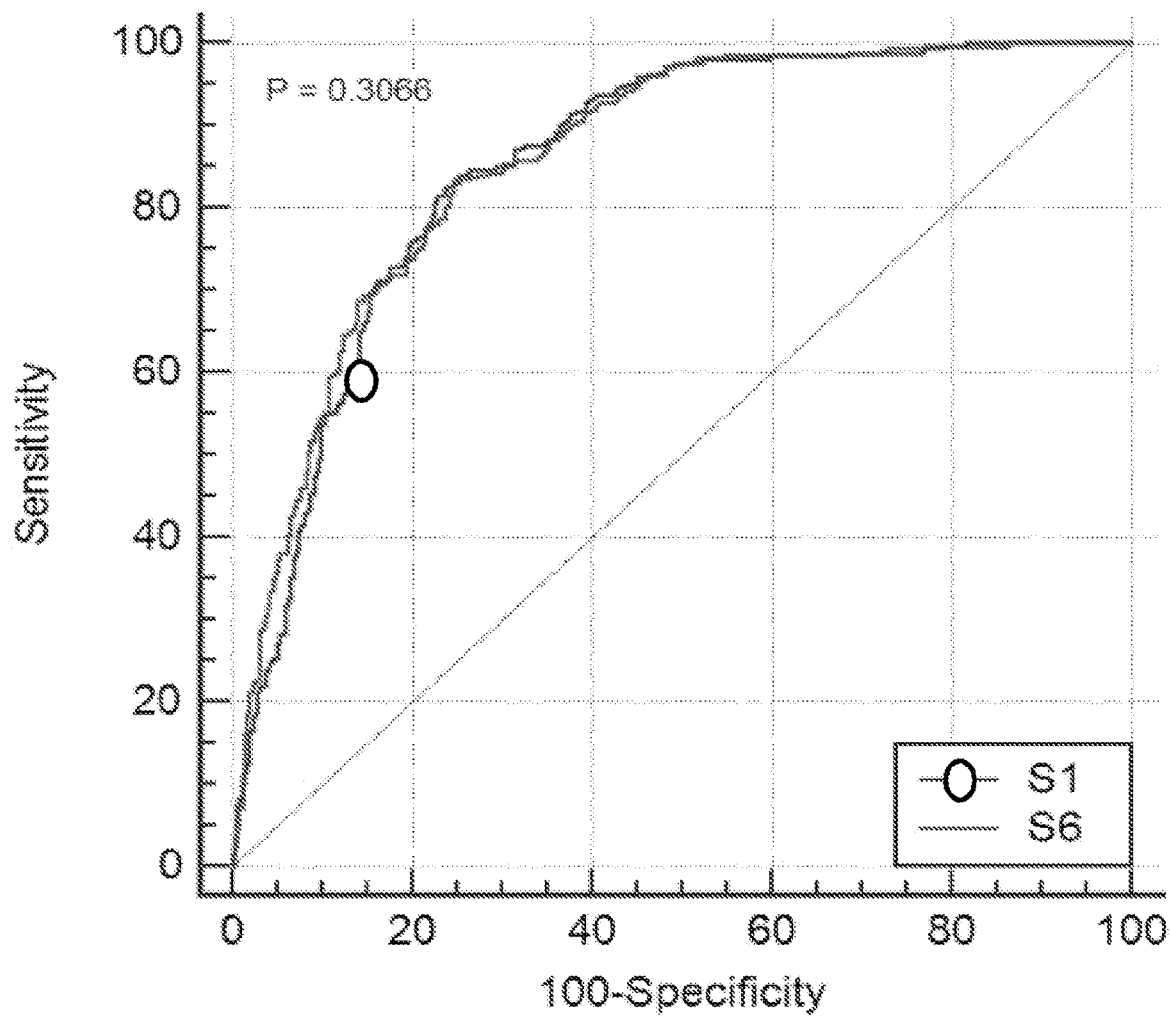
FIG. 7. Provides a chart detailing aspects of the lung cancer patient evaluation system.

As shown in in Table S4, the candidate model built with the use of mRMR and LASSO was with the highest AUC=0.850 and selected as the optimal predictive model. The IFS curve of this model was presented in FIG. 5. Obviously, based on IFS curve, the top-one feature was the predominant feature for the model, while other features only did marginal contribution. This point was confirmed by the comparison between model built with the top-one feature and that built with all six features, as shown in FIG. 7. There was no significant difference (p=0.307) between the models that built with the top-one feature and that built with the top six features. FIG. 5 depicts the IFS curve of the optimal predictive model. Sn represents feature set containing top n features ranked by feature ranking algorithm and used to build model.

As shown in more detail in FIG. 7, a comparison between models built with the top-one feature and that built with top six features is provided. It will be appreciated that in the foregoing example, the top-one feature, Intensity-Skewness was identified as the optimal quantitative imaging biomarker.

The identified Intensity-Skewness was a 2D image feature, which was computed on the image slice where tumor segmentation has the largest diameter. Let X(i) denote the intensity of the ith element within the slice of tumor segmentation, Intensity-Skewness is computed as:

$$\text{Skewness} = \frac{\frac{1}{N}\sum_{i=1}^{N}(X(i)-\overline{X})^3}{\sqrt{\frac{1}{N}\sum_{i=1}^{N}(X(i)-\overline{X})^3}}$$

Where N is the total pixels within the tumor segmentation.

Figure 8:
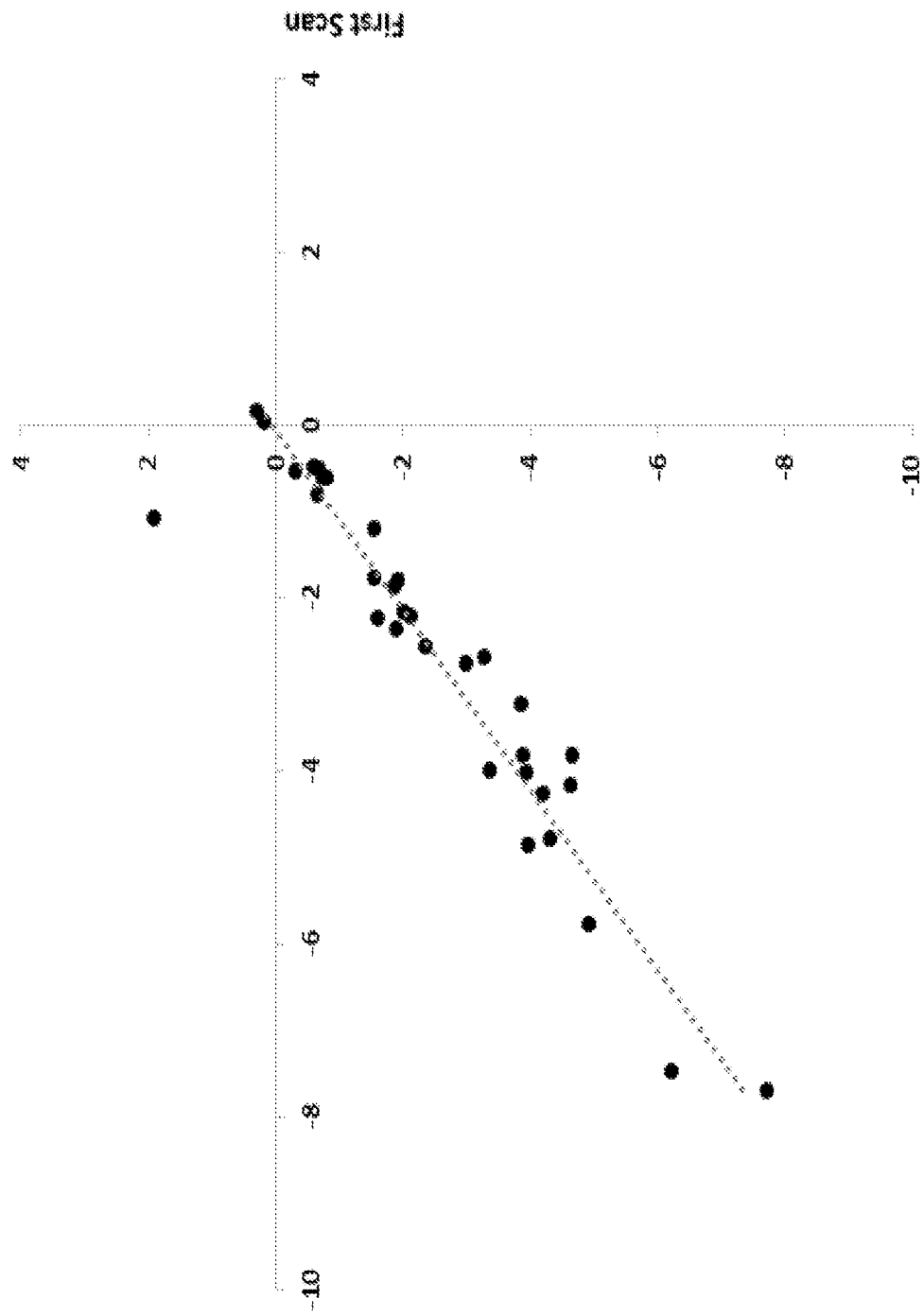
FIG. 8. Provides a chart detailing aspects of the lung cancer patient evaluation system.

Based on an evaluation of the biomarker data, the measurements of Intensity-Skewness on the same-day repeat CT scans were presented in FIG. 8, which achieved a CCC(95% CI) of 0.941 (0.882, 0.970). The measurements of Intensity-Skewness on the internal validation cohort done by two radiologists were presented in FIG. 9, which achieved a CCC(95% CI) of 0.952 (0.942, 0.960).

Figure 9:
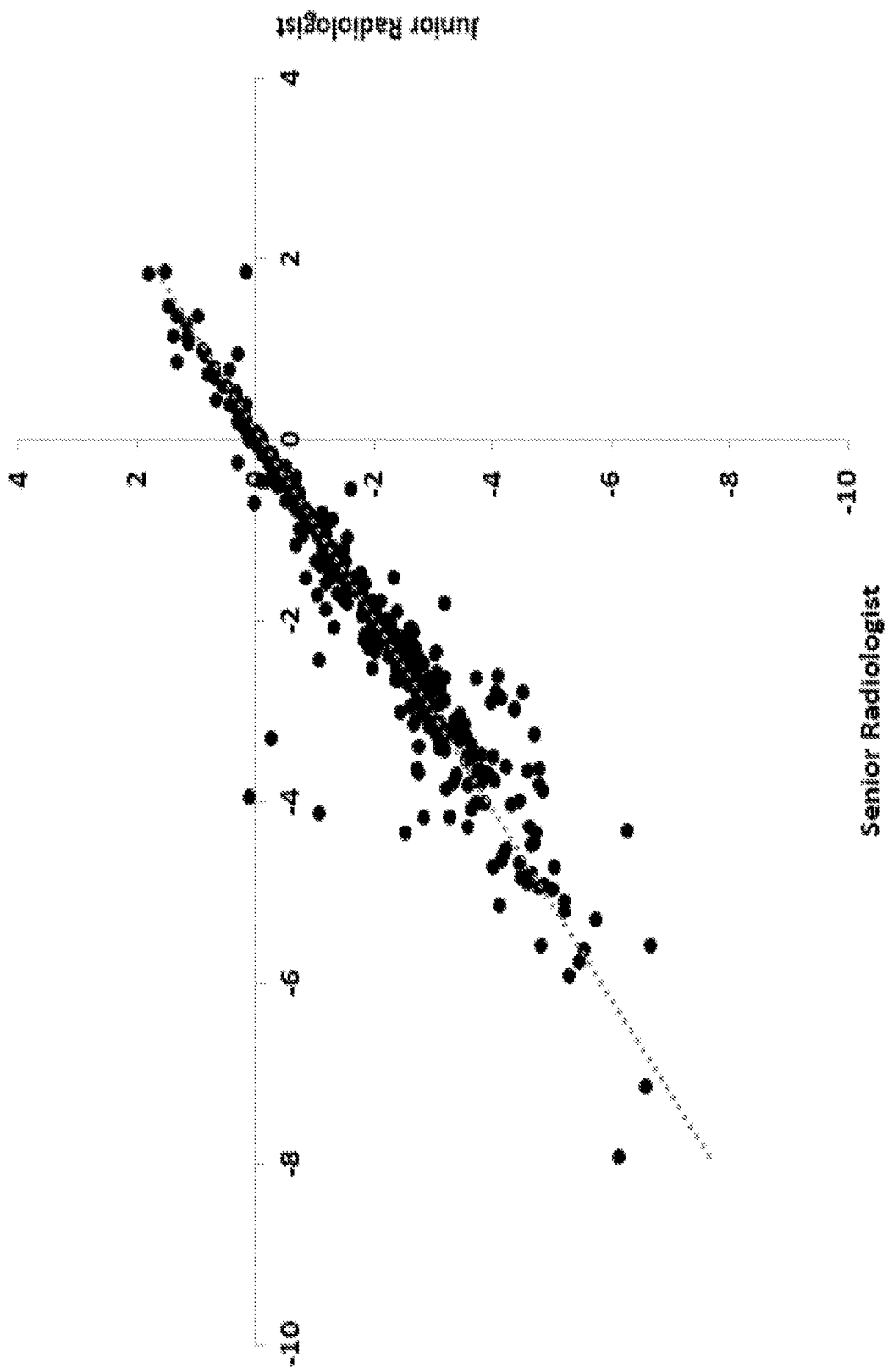
FIG. 9. Provides a chart detailing aspects of the lung cancer patient evaluation system.

As shown in more detail, FIG. 9 shows the measurements of Intensity-Skewness performed by two radiologists of different experience.

Figure 10:
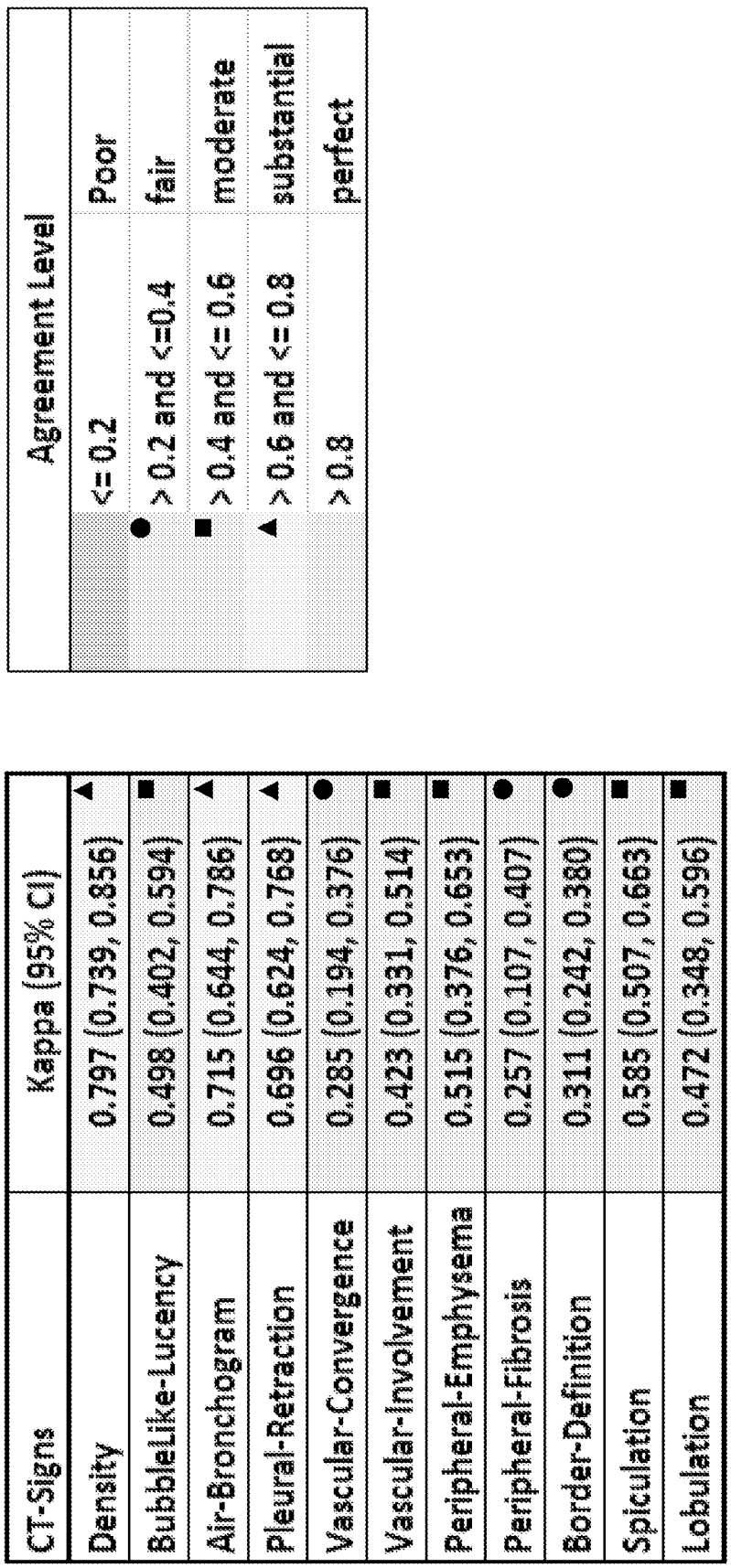
FIG. 10. Provides a chart detailing aspects of the lung cancer patient evaluation system.

In one or more further implementations, the predictive engine 109 can be configured by one or more benchmarking modules to benchmark the identified biomarkers that have a high correlation to patient classifications of interest. For example, one or more benchmarking modules configures a processor or computer of the prediction engine to benchmark the intensity-skewness against clinical parameters and radiological biomarkers in terms of AUC. Clinical parameters were patient's Age, Gender, Cancer-Stage and tumor's Volume. Radiological biomarker was the Density, which was identified out of the eleven CT signs (See Table S1 for details). The identification of radiological biomarker was based on two criteria, 1) Inter-reader reproducibility of radiological biomarker should be at least substantial, i.e., Kappa-index >0.6 (23); and 2) radiological biomarker should have differentiation ability, i.e., distribution between the dichotomous data should be significantly different with p-value<0.01. Results of inter-reader reproducibility and data distribution for the eleven CT signs were presented in FIG. 10 and Table S5, respectively. Based on the two criteria, one radiological biomarker Density was identified. As shown in FIG. 10, the kappa-index for the eleven CT signs is provided. The inter-reader agreement were performed by two independent radiologists, a senior radiologist (E.L. with experience of more than 20 year) and a junior radiologist (W.D. with experience of approximate 3 year) on the training cohort.

TABLE S7

Frequencies of the CT signs.

| CT signs | Status | Training Set Good DFS | Training Set Mid/Poor DFS | p-value | Internal validation set Good DFS | Internal validation set Mid/Poor DFS | p-value |
|---|---|---|---|---|---|---|---|
| Density | Solid | 27 (24%) | 244 (70%) | <0.0001* | 63 (45%) | 261 (91%) | <0.0001 |
|  | Partial Solid | 44 (39%) | 80 (23%) |  | 49 (35%) | 25 (25%) |  |
|  | GGO | 42 (37%) | 26 (7%) |  | 28 (20%) | 2 (1%) |  |
| BubbleLike-Lucency | Yes | 35 (31%) | 89 (25%) | 0.300 | 35 (25%) | 79 (27%) | 0.676 |
|  | No | 78 (69%) | 261 (75%) |  | 105 (75%) | 209 (73%) |  |
| Air-Bronchogram | Yes | 31 (37%) | 155 (44%) | 0.0022* | 44 (31%) | 89 (31%) | 0.999 |
|  | No | 82 (73%) | 195 (56%) |  | 96 (69%) | 199 (69%) |  |
| Pleural-Retraction | Yes | 58 (51%) | 241 (69%) | 0.0011* | 86 (55%) | 189 (66%) | 0.458 |
|  | No | 55 (49%) | 109 (31%) |  | 54 (45%) | 99 (34%) |  |
| Vascular-Convergence | Yes | 64 (57%) | 253 (72%) | 0.0027* | 77 (59%) | 185 (64%) | 0.084 |
|  | No | 49 (43%) | 97 (28%) |  | 63 (4%) | 103 (36%) |  |
| Vascular-Involvement | Yes | 68 (60%) | 245 (70%) | 0.0681 | 83 (10%) | 211 (73%) | 0.0049 |
|  | No | 45 (40%) | 105 (30%) |  | 57 (90%) | 77 (27%) |  |
| Peripheral-Emphysema | Yes | 8 (7%) | 40 (11%) | 0.254 | 14 (10%) | 35 (12%) | 0.621 |
|  | No | 105 (93%) | 310 (89%) |  | 126 (90%) | 253 (88%) |  |
| Peripheral-Fibrosis | Yes | 3 (3%) | 55 (16%) | 0.0005* | 5 (4%) | 41 (14%) | 0.0015 |
|  | No | 110 (97%) | 295 (84%) |  | 135 (96%) | 247 (86%) |  |
| Border-Definition | Well-defined | 60 (53%) | 282 (81%) | <0.0001* | 96 (69%) | 245 (85%) | 0.0001 |
|  | Ill-defined | 53 (47%) | 68 (19%) | <0.0001* | 44 (31%) | 43 (15%) |  |
| Spiculation | Yes | 28 (25%) | 202 (58%) |  | 59 (42%) | 188 (65%) | <0.0001 |
|  | No | 85 (75%) | 148 (42%) |  | 81 (58%) | 100 (35%) |  |
| Lobulation | Yes | 63 (56%) | 300 (86%) | <0.0001* | 104 (74%) | 269 (96%) | <0.0001 |
|  | No | 50 (44%) | 50 (14%) |  | 36 (26%) | 19 (7%) |  |

*indicates significant differences on training cohort.

It will be appreciated that the classification performance of quantitative imaging biomarker might be affected by patients' characteristics and CT scanning/reconstruction parameters. In order to test the generalization ability of the identified Intensity-Skewness, we performed stratification analysis on the subpopulations in terms of age, gender, TNM stage, manufacturer of CT and slice thickness of CT reconstruction. The AUC was used to evaluate the classification performance of Intensity-Skewness on the subpopulations. The results showed that Intensity-Skewness could maintain high AUCs (>0.8) in all subpopulations, indicating a good generalizability of the Intensity-Skewness. It should be noted that, the comparisons in Table S6 were relative, as the patient number of subpopulations were different.

TABLE S6

Stratification analysis of Intensity-Skewness on the subpopulations.

|  |  | Training Cohort AUC | Training Cohort p-value* | Internal Validation Cohort AUC | Internal Validation Cohort p-value* | External Validation Cohort AUC | External Validation Cohort p-value* |
|---|---|---|---|---|---|---|---|
| Age | >=60 | 0.862 | 0.452 | 0.808 | 0.49 | 0.882 | 0.005 |
|  | <60 | 0.844 | 0.104 | 0.859 | <0.001 | 0.838 | 0.007 |
| Gender | Male | 0.873 | 0.024 | 0.828 | 0.12 | 0.875 | 0.09 |
|  | Female | 0.825 | <0.001 | 0.801 | 0.107 | 0.87 | 0.217 |
| TNM Stage | 0-1 | 0.803 | <0.001 | 0.802 | 0.005 | 0.841 | 0.006 |
|  | II-III | 0.815 | 0.022 | 0.807 | <0.001 | 0.905 | <0.001 |
| Manufacturer | GE_MEDICAL_SYSTEMS | 0.874 | 0.06 | 0.808 | 0.57 | 0.827 | 0.006 |
|  | SIEMENS | 0.843 | 0.242 | N/A | N/A | 0.867 | 0.345 |
|  | Philips | 0.866 | 0.279 | 0.838 | 0.01 | 0.894 | 0.034 |
|  | TOSHIBA | 0.817 | <0.001 | 0.843 | 0.004 | 1 | <0.001 |
| Slice thickness | <=1 mm | 0.842 | 0.05 | 0.815 | 0.876 | 0.806 | 0.924 |
|  | >1 mm | 0.853 | 0.644 | 0.826 | 0.117 | 0.847 | 0.191 |

\* indicates comparisons with the entire population in the cohort.

Figure 11B:
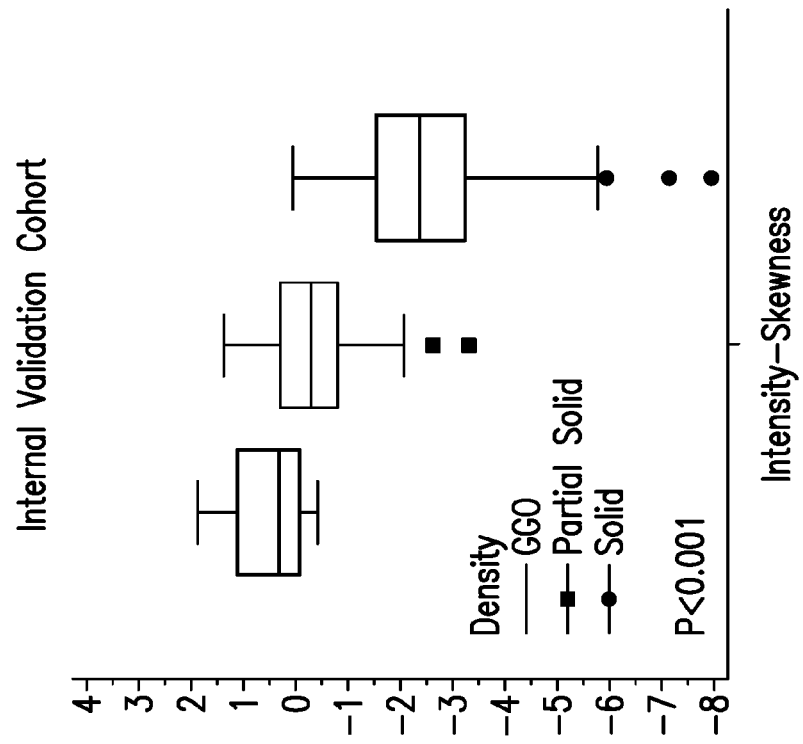
FIGS. 11A and 11B. Provides a chart detailing aspects of the lung cancer patient evaluation system.
Figure 11A:
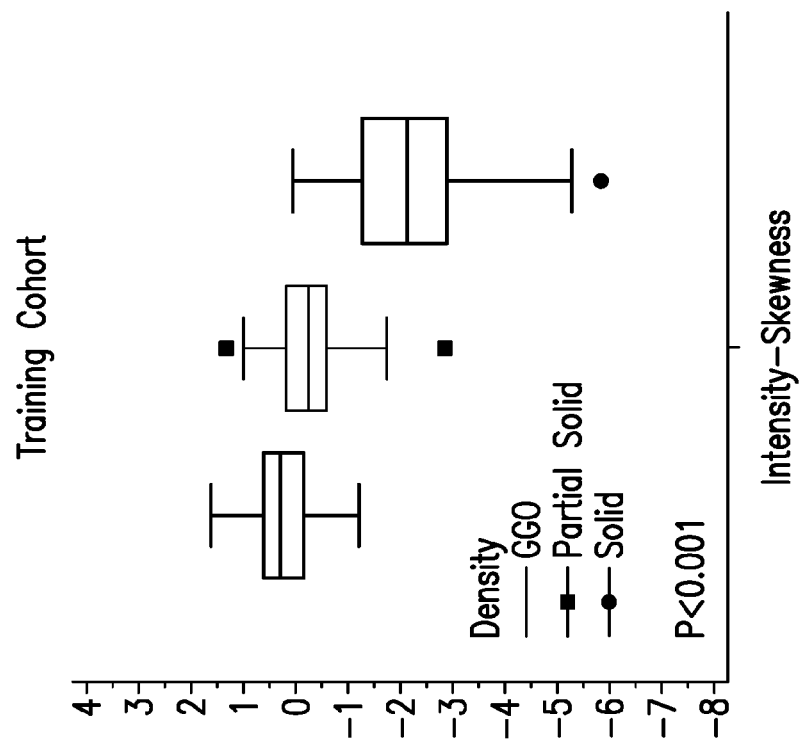

As shown in FIGS. 11A and 11B, the Intensity-Skewness and Density were identified as the optimal imaging and radiological biomarkers, respectively. The association between the identified imaging and radiological biomarkers was shown by analysis of variance (one-way ANOVA) and box-plot. Here, the association between the identified imaging and radiological biomarkers. (a) and (b) shows the distributions and analysis of variance (one-way ANOVA) of Intensity-Skewness versus Density in the training and internal validation cohorts, respectively.

In the provided example, the Intensity-Skewness was applied to predict the eight histologic subtypes directly using the one-versus-all strategy, i.e., training a single classifier for each histologic subtype, with the samples of that histologic subtype as positive samples while all other histologic subtypes histologic subtypes as negatives. Specially, given that the distribution of the eight histologic subtypes were highly imbalance in the study cohorts, we evaluated the specificity of each prediction while setting sensitivity at least more than 80%.

be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim

TABLE S7

Prediction of eight histologic subtypes using Intensity-Skewness.

| DFS Associated Histologic Subgroup | Histologic subtypes | Training Cohort | | | Internal Validation Cohort | | | External Validation Cohort | | |
|---|---|---|---|---|---|---|---|---|---|---|
| | | AUC (95% CI) | Sensitivity | Specificity | AUC (95% CI) | Sensitivity | Specificity | AUC (95% CI) | Sensitivity | Specificity |
| Good Prognosis | AIS | 0.862 (0.801, 0.901) | 0.833 | 0.770 | 0.915 (0.868, 0.946) | 0.821 | 0.868 | 0.777 (0.632, 0.876) | 0.900 | 0.706 |
| | MIA | 0.911 (0.813, 0.961) | 0.857 | 0.875 | 0.946 (0.912, 0.964) | 1.000 | 0.929 | 0.878 (0.834, 0.912) | 0.806 | 0.798 |
| | LEP | 0.778 (0.728, 0.822) | 0.805 | 0.648 | 0.722 (0.666, 0.772) | 0.807 | 0.467 | 0.768 (0.692, 0.831) | 0.815 | 0.600 |
| | ACI | 0.566 (0.513, 0.618) | 0.802 | 0.229 | 0.560 (0.503, 0.616) | 0.802 | 0.152 | 0.515 (0.458, 0.572) | 0.803 | 0.265 |
| | PAP | 0.680 (0.606, 0.745) | 0.803 | 0.407 | 0.677 (0.611, 0.737) | 0.815 | 0.124 | 0.560 (0.746, 0.642) | 0.825 | 0.188 |
| Mid/Poor Prognosis | MIP | 0.692 (0.497, 0.836) | 0.818 | 0.095 | 0.564 (0.437, 0.683) | 0.850 | 0.120 | 0.767 (0.672, 0.840) | 0.833 | 0.072 |
| | SOL | 0.769 (0.703, 0.824) | 0.818 | 0.100 | 0.731 (0.636, 0.807) | 0.850 | 0.042 | 0.844 (0.782, 0.891) | 0.824 | 0.021 |
| | MUC | 0.689 (0.568, 0.788) | 0.846 | 0.111 | 0.692 (0.625, 0.751) | 0.807 | 0.108 | 0.625 (0.528, 0.712) | 0.833 | 0.173 |

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the claims that follow, the respective features recited in those points, and by equivalents of such features.

The invention claimed is:

1. A method of treating a subject with a lung tumor, the method comprising:
   (a) obtaining computed tomography (CT) image slices of the subject, wherein the CT image slices comprise images of the lung tumor;
   (b) identifying a first CT image slice where the lung tumor has a largest diameter among the CT image slices;
   (c) determining intensity-skewness of the lung tumor on the first CT image slice;
   (d) classifying the subject to one of disease-free-survival (DFS)-associated histologic subgroup based on a comparison of the intensity-skewness to a threshold value; and
   (e) treating the subject with at least one of surgery, chemotherapy and/or radiotherapy, where the intensity-skewness is no greater than the threshold value.

2. The method of claim 1, wherein the intensity-skewness is:

$$\text{Intensity\_Skewness} = \frac{\frac{1}{N}\sum_{i=1}^{N}(X(i)-\bar{X})^3}{\left(\sqrt{\frac{1}{N}\sum_{i=1}^{N}(X(i)-\bar{X})^2}\right)^3}$$

wherein the first CT image slice N pixels: 1, ... ith, ... N, X(i) being an intensity of the ith pixel within the first CT image slice, $\bar{X}$ being a mean intensity of all pixels within the first CT image slice.

3. The method of claim 1, wherein the threshold value is accessed from a pre-trained machine learning model configured to output a value that corresponds to the demarcation between a first disease-free-survival (DFS)-associated histologic subgroup and a second disease-free-survival (DFS)-associated histologic subgroup-, wherein the pre-trained model is trained using a training set of CT images.

4. A method for treating a subject with a lung tumor, the method comprising:
   (a) obtaining computed tomography (CT) image slices of the subject, wherein the CT image slices comprise images of the lung tumor;
   (b) identifying a first CT image slice where the lung tumor has a largest diameter among the CT image slices;
   (c) determining intensity-skewness of the lung tumor on the first CT image slice;
   (d) determining that the lung tumor is a mid/poor disease-free-survival (DFS)-associated histologic subgroup, if the intensity-skewness is no greater than −1.5; and
   (e) treating the subject with at least one of surgery, chemotherapy and/or radiotherapy.

5. The method of claim 4, wherein intensity-skewness is:

$$\text{Intensity\_Skewness} = \frac{\frac{1}{N}\sum_{i=1}^{N}(X(i)-\bar{X})^3}{\left(\sqrt{\frac{1}{N}\sum_{i=1}^{N}(X(i)-\bar{X})^2}\right)^3}$$

wherein the first CT image slice has N pixels: 1, ... ith, ... N, X(i) being an intensity of the ith pixel within the first CT image slice, $\bar{X}$ being a mean intensity of all pixels within the first CT image slice.

6. The method of claim 1, wherein the lung tumor is lung adenocarcinoma.

7. The method of claim 6, wherein the lung adenocarcinoma is invasive adenocarcinoma.

8. The method of claim 7, wherein the lung adenocarcinoma is acinar predominant (ACI) adenocarcinoma, papillary predominant (PAP) adenocarcinoma, micropapillary predominant (MIP) adenocarcinoma, and solid predominant (SOL) adenocarcinoma; or invasive mucinous (MUC) adenocarcinoma.

9. The method of claim 1, wherein the lung tumor is non-small cell lung cancer (NSCLC).

10. The method of claim 1, wherein the chemotherapy comprises a platinum-based antineoplastic drug.

11. The method of claim 10, wherein the platinum-based antineoplastic drug is cisplatin and/or or carboplatin.

12. The method of claim 1, wherein the chemotherapy comprises gemcitabine, paclitaxel, docetaxel, pemetrexed, etoposide, vinorelbine, topotecan, irinotecan, or combinations thereof.

13. The method of claim 1, wherein the surgery comprises a wedge resection.

14. The method of claim 4, wherein the lung tumor is lung adenocarcinoma.

15. The method of claim 14, wherein the lung adenocarcinoma is acinar predominant (ACI) adenocarcinoma, papillary predominant (PAP) adenocarcinoma, micropapillary predominant (MIP) adenocarcinoma, and solid predominant (SOL) adenocarcinoma; or invasive mucinous (MUC) adenocarcinoma.

16. The method of claim 4, wherein the lung tumor is non-small cell lung cancer (NSCLC).

* * * * *